(12) United States Patent
McKenney et al.

(10) Patent No.: US 7,472,233 B2
(45) Date of Patent: *Dec. 30, 2008

(54) MEMORY ALLOCATOR FOR A MULTIPROCESSOR COMPUTER SYSTEM

(75) Inventors: Paul E. McKenney, Beaverton, OR (US); Phillip E. Krueger, Lake Oswego, OR (US); Stuart A. Friedberg, Aloha, OR (US); Brent A. Kingsbury, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 510 days.

This patent is subject to a terminal disclaimer.

(21) Appl. No.: 10/835,768

(22) Filed: Apr. 30, 2004

(65) Prior Publication Data
US 2004/0205304 A1   Oct. 14, 2004

Related U.S. Application Data

(63) Continuation of application No. 09/028,285, filed on Feb. 24, 1998, now Pat. No. 6,785,888.

(60) Provisional application No. 60/057,243, filed on Aug. 29, 1997.

(51) Int. Cl.
*G06F 12/00* (2006.01)

(52) U.S. Cl. .................. 711/147; 711/148; 711/153; 711/170; 711/171

(58) Field of Classification Search .............. 711/148, 711/170, 147, 153, 171
See application file for complete search history.

(56) References Cited

U.S. PATENT DOCUMENTS

| | | | |
|---|---|---|---|
| 5,592,625 A * | 1/1997 | Sandberg .................... | 711/147 |
| 5,829,041 A * | 10/1998 | Okamoto et al. ............ | 711/147 |
| 6,148,377 A * | 11/2000 | Carter et al. ................ | 711/147 |
| 6,205,528 B1 * | 3/2001 | Kingsbury et al. .......... | 711/170 |
| 6,247,041 B1 * | 6/2001 | Krueger et al. .............. | 718/104 |
| 6,505,286 B1 * | 1/2003 | Kingsbury et al. .......... | 711/170 |

* cited by examiner

*Primary Examiner*—Sheng-Jen Tsai
(74) *Attorney, Agent, or Firm*—Steven Lieske Bennett

(57) ABSTRACT

Methods for dynamically allocating memory in a multiprocessor computer system such as a non-uniform memory access (NUMA) machine having distributed shared memory. The methods include allocating memory by specified node, memory class, or memory pool in response to requests by the system (kernel memory allocation) or a user (application memory allocation). Through these methods memory is allocated more efficiently in a NUMA machine. For example, allocating memory on a specified node in a NUMA machine, such as the same node on which a process requiring the memory is running, reduces memory access time. Allocating memory from a specified memory class allows device drivers with restricted DMA ranges to operate with dynamically allocated memory. Other benefits of these methods include minimizing expensive remote-memory accesses using a distributed reference count mechanism and lock-free cache access.

21 Claims, 15 Drawing Sheets

MEMORY ALLOCATOR FOR A MULTIPROCESSOR COMPUTER SYSTEM

RELATED APPLICATION DATA

This application is based on U.S. Provisional Application Ser. No. 60/057,243, filed Aug. 29, 1997, to which priority is claimed, and is further a continuation of the currently pending U.S. patent application Ser. No. 09/028,285, filed Feb. 24, 1998 now U.S. Pat. No. 6,785,888, to which priority is also claimed.

COMPACT DISC SUBMISSION

The CD-ROM having an ASCII representation of the computer program referenced elsewhere in the specification is part of the present patent application, and is hereby incorporated by reference. The CD-ROM contains thereon the following file, program.txt, having a modified date of Jul. 1, 2002, and having a file size of 52 kilobytes. The file contains specific definitions for data structures referenced throughout the specification, and the specific definitions contained on the CD-ROM are hereby incorporated by reference.

FIELD OF THE INVENTION

This invention relates generally to memory allocation in a computer system. More particularly, this invention relates to memory allocation in the environment of a shared memory multiprocessor computer system.

BACKGROUND AND SUMMARY OF THE INVENTION

The core of a computer's operating system is known as the kernel. It performs a number of tasks central to the computer's operation including managing memory, files, and peripheral devices, launching application programs, and allocating system resources.

Programs interact with the kernel by invoking a well defined set of system calls. The system calls call functions within the kernel to perform various operations for the calling program such as displaying text or graphics or controlling a peripheral device. At a deeper level, kernel functions themselves may make further function calls within the kernel. One such further function call in some UNIX-based operating systems is kmem_alloc, which the kernel uses to call the kmem_alloc function to allocate memory needed for an operation the kernel is to perform. The kmem_alloc function, like the more familiar application-level malloc function, dynamically allocates memory for an executing process. The kmem_alloc function may be used, for example, to dynamically allocate memory for locks temporarily created by the operating system.

Memory allocation functions are useful for allocating memory in both single and multiprocessor computers. By definition, multiprocessor computers contain multiple processors that can execute multiple parts of a computer program or multiple distinct programs simultaneously, in a manner known as parallel computing. In general, multiprocessor computers execute multithreaded-programs or multiple single-threaded programs faster than conventional single processor computers, such as personal computers (PCs), that must execute programs sequentially. The actual performance advantage is a function of a number of factors, including the degree to which parts of a multithreaded-program or multiple distinct programs can be executed in parallel and the architecture of the particular multiprocessor computer at hand.

Multiprocessor computers may be classified by how they share information among the processors. Shared-memory multiprocessor computers offer a common physical memory address space that all processors can access. Multiple processes or multiple threads within the same process can communicate through shared variables in memory that allow them to read or write to the same memory location in the computer. Message passing multiprocessor computers, in contrast, have a separate memory space for each processor, requiring processes in such a system to communicate through explicit messages to each other.

Shared-memory multiprocessor computers may further be classified by how the memory is physically organized. In distributed shared-memory computers, the memory is divided into modules physically placed near each processor. Although all of the memory modules are globally accessible, a processor can access memory placed nearby faster than memory placed remotely. Because the memory access time differs based on memory location, distributed shared memory systems are often called non-uniform memory access (NUMA) machines. By contrast, in centralized shared-memory computers, the memory is physically in one location. Centralized shared-memory computers are called uniform memory access (UMA) machines because the memory is equidistant in time from each of the processors. Both forms of memory organization typically use high-speed cache memory in conjunction with main memory to reduce execution time.

Multiprocessor computers with distributed shared memory are often organized into multiple nodes with one or more processors per node. The nodes interface with each other through a memory-interconnect network by using a protocol, such as the protocol described in the Scalable Coherent Interface (SCI)(IEEE 1596). UMA machines typically use a bus for interconnecting all of the processors.

Further information on multiprocessor computer systems in general and NUMA machines in particular can be found in a number of works including *Computer Architecture: A Quantitative Approach* ($2^{nd}$ Ed. 1996), by D. Patterson and J. Hennessy, which is hereby incorporated by reference.

In a NUMA machine the memory is physically closer to a processor on the same node than a processor on another node. Consequently, processes run faster if their memory is placed on the node containing the processor running that process, since the processor and memory would not need to communicate between nodes. In a UMA machine, in contrast, the memory is substantially equidistant from all processors, and there is no performance advantage to placing a process's memory in any particular range of physical addresses.

A single operating system typically controls the operation of a multinode multiprocessor computer with distributed shared memory. Examples of suitable operating systems include UNIX-based operating systems such as DYNIX/ptx, BSD, SVR4, UnixWare, or PC UNIX. For background information on such operating systems, see Bach, M. J., *The Design of the UNIX Operating System*, Prentice-Hall, 1986; Vahalia, U., *Unix Internals: The New Frontier*, Prentice-Hall, 1996; McKusick, M., et al., *The Design and Implementation of the 4.4 BSD Operating System*, Addison-Wesley, 1996, which are all hereby incorporated by reference.

Conventional methods for kernel or application memory allocation in multiprocessor systems do not recognize the performance advantage inherent in NUMA systems. Memory is treated as a global resource, and these methods (implemented in kmem_alloc or equivalent functions) allocate memory without regard to where the memory is located within the multiprocessor system. As a result, the system as a whole operates more slowly than if physical memory location were taken into account.

A general objective of the invention, therefore, is to provide an efficient method and means for dynamically allocating memory among memory choices. More specifically, the objectives of the invention include:

1. Providing for allocation of memory on a specified node in a NUMA machine, such as the same node on which a process requiring the memory is running, to promote memory locality and low memory latency.

2. Providing for allocation of memory from a specific requested memory class. This allows drivers for devices with restricted DMA ranges to operate with dynamically allocated memory.

3. Providing for a default choice of node and memory class if none is explicitly specified.

4. Providing a new memory allocation function that is compatible with standard memory allocation functions so that the new memory allocation function may be used by software designed to operate on non-NUMA machines without changing that software.

5. Providing for limits on the amount of memory that may be consumed by a particular type of memory, without affecting the efficiency of common-case allocations.

6. Providing for the performance of lock-free common-case allocations and deallocations, while still allowing CPUs to extract memory from each other's pools in low-memory situations.

The foregoing and other objectives, features, and advantages of the invention will become more apparent from the following detailed description of a preferred embodiment which proceeds with reference to the accompanying drawings.

DETAILED DESCRIPTION OF A PREFERRED EMBODIMENT

System Overview

Nomenclature used in this description of a preferred embodiment of the invention should be given its ordinary technical meaning. Particular terms that require further definition appear in Appendix A.

Figure 1:
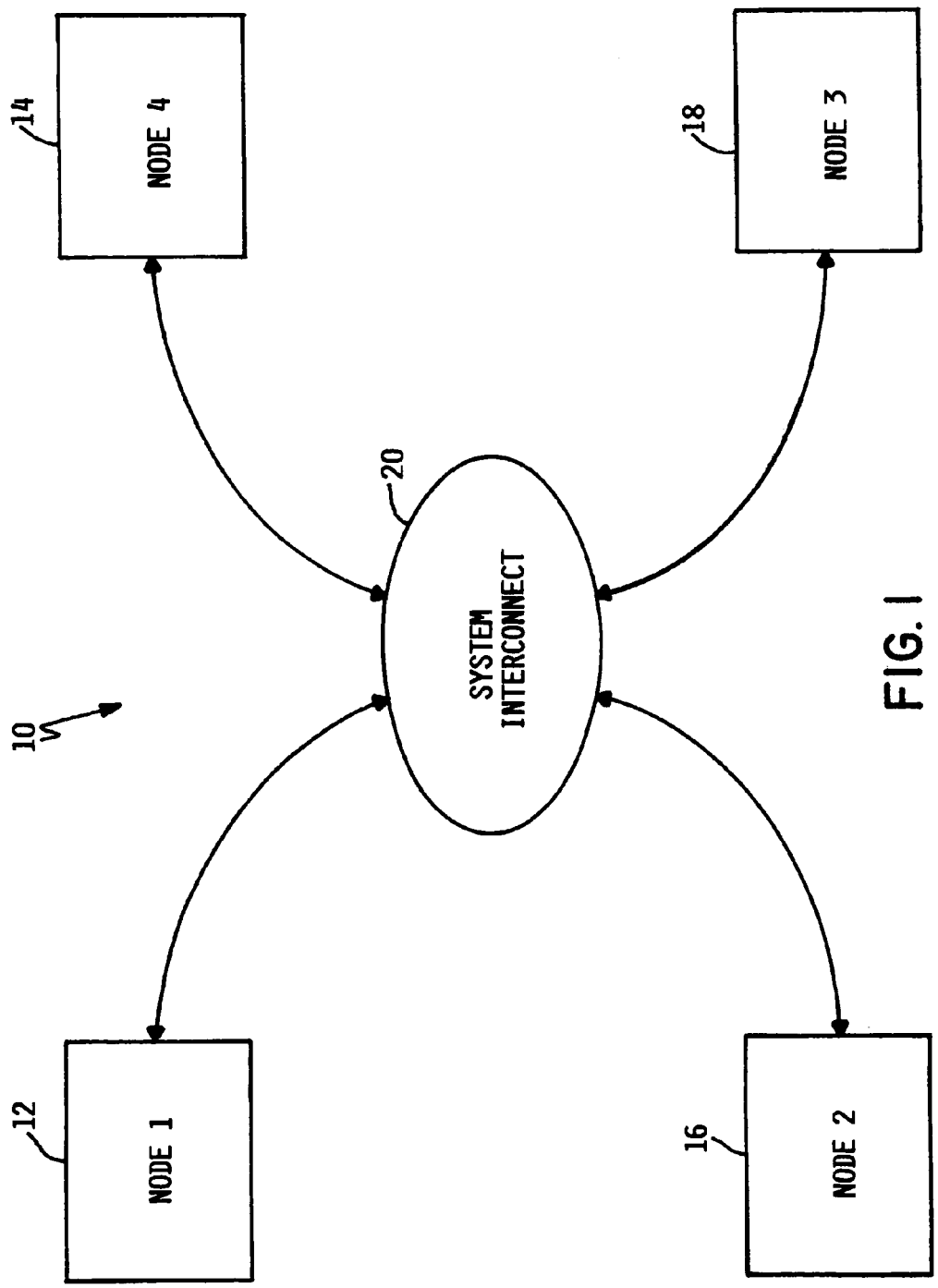
FIG. 1 is a block diagram of a multinode multiprocessor computer system with a system interconnect coupling the nodes together.

FIG. 1 is a block diagram of a multinode, multiprocessor computer system 10 in accordance with the invention. System 10 uses a computer architecture based on Distributed-Shared Memory (DSM) and is a non-uniform memory access (NUMA) machine. Four nodes 12, 14, 16, and 18 are shown connected by a system interconnect 20 (i.e., a network) that permits any node to communicate with any other node. Specifically, the purpose of system interconnect 20 is to allow processors in any node to access the memory resident in any other node. System interconnect 20 is a switch-based network that uses the Scalable Coherent Interface (SCI) interconnection mechanism. SCI is an IEEE-approved standard, or protocol (1596), well documented in a number of publications including *IEEE Std* 1596-1992 (2 Aug. 1993) and *Multiprocessor Interconnection Using SCI*, a Master Thesis by Ivan Tving, DTH ID-E 579 (1994), both of which are hereby incorporated by reference.

The physical links of interconnect 20 provide high bandwidth and low latency and are scalable to allow for the addition of more nodes. Links that meet these requirements include point-to-point interconnects with a data throughput of one gigabyte/second or greater. The links can be configured in any number of suitable ways for connecting nodes 12, 14, 16, and 18 such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James. E. Goodman, December 1991, *Computer Sciences Technical Report* #1058, University of Wisconsin—Madison, which is hereby incorporated by reference.

Node Overview

Figure 2:
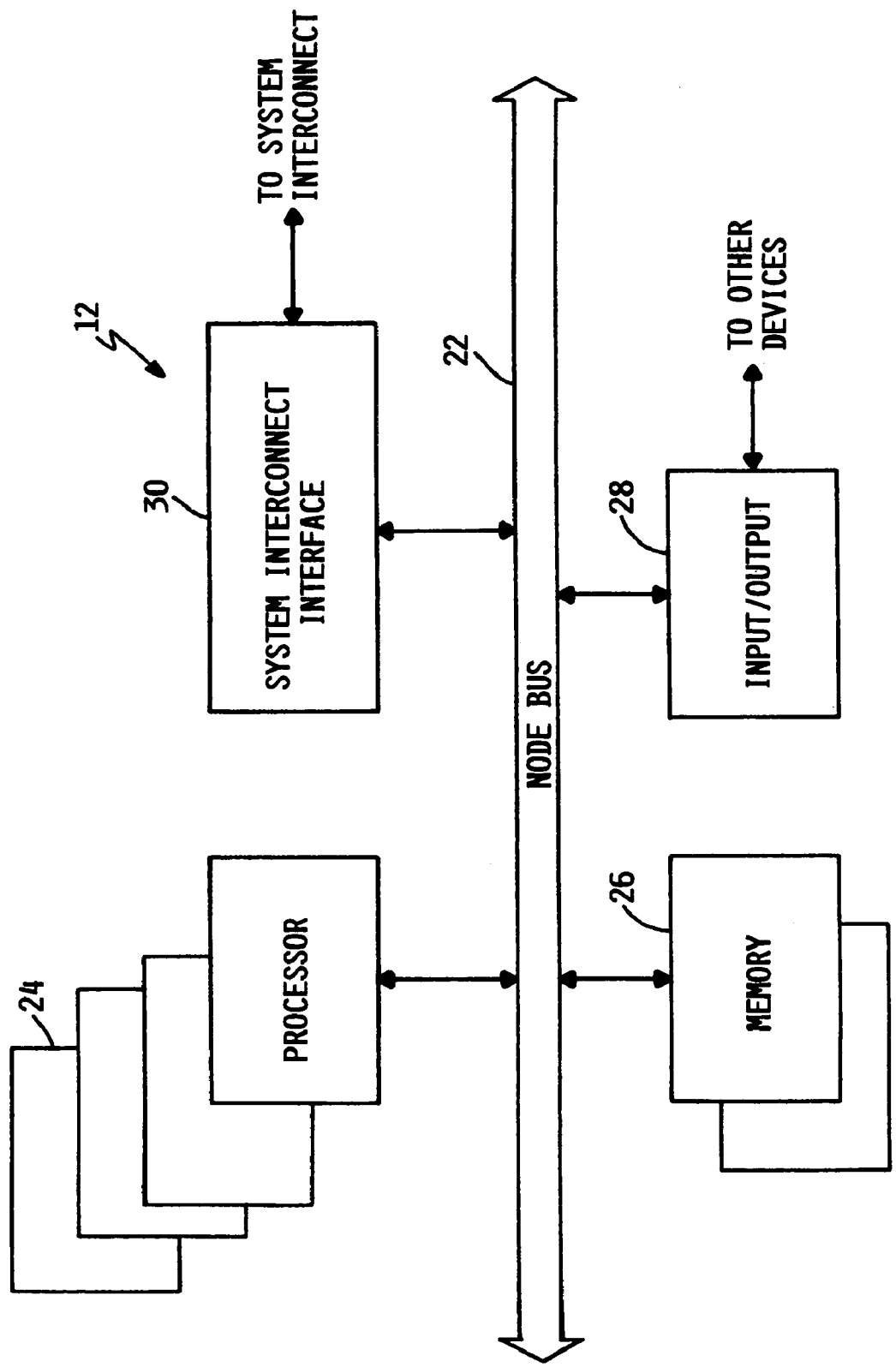
FIG. 2 is a block diagram of one of the nodes of the computer system of FIG. 1.

A block diagram of node 12 on system 10 is shown in FIG. 2. The node includes a conventional symmetrical multiprocessor (SMP) node bus 22 for connecting multiple data processors 24 to local memory 26. (When the nodes are constructed with just four processors, they are often referred to as "quads.") For clarity, nodes 12, 14, 16, and 18 may be referred to as home nodes or remote nodes in certain circumstances. A home node is one whose local memory stores a memory block of interest (i.e., the address of the memory block falls within the address range supported by the local memory or cache); all of the other nodes are then remote nodes with respect to that memory block. Additionally, a node may be a requesting node or a responding node. A requesting node is one requesting data; a responding node is one furnishing such data. Input/output (I/O) 28, which is also connected to bus 22, connects the node to devices outside computer system 10 for communicating information between the computer system and the outside world. I/O 28 may be of conventional design and includes means for connecting the node (and hence system 10) to personal computers, local area networks, etc., that wish to utilize the power of the multinode computer system. The I/O 28 may also allow for connection to peripheral devices, such as floppy disks, hard disks, CD-ROMs etc. To connect node 12 to the other nodes in the system, the node includes a system interconnect interface 30. The system interconnect interface forms part of interconnect 20 along with the physical links-between nodes and the same devices on the other nodes of the computer system 10. In the present embodiment, interface 30 is constructed to implement the SCI standard for data communication between the nodes, allowing a processor on one node to directly access data stored on another node. The interface 30 also contains a remote cache in the present embodiment, although this combination is not required for the invention. The remote cache could also be separate from the system interconnect interface.

Operating System Overview

Figure 3:
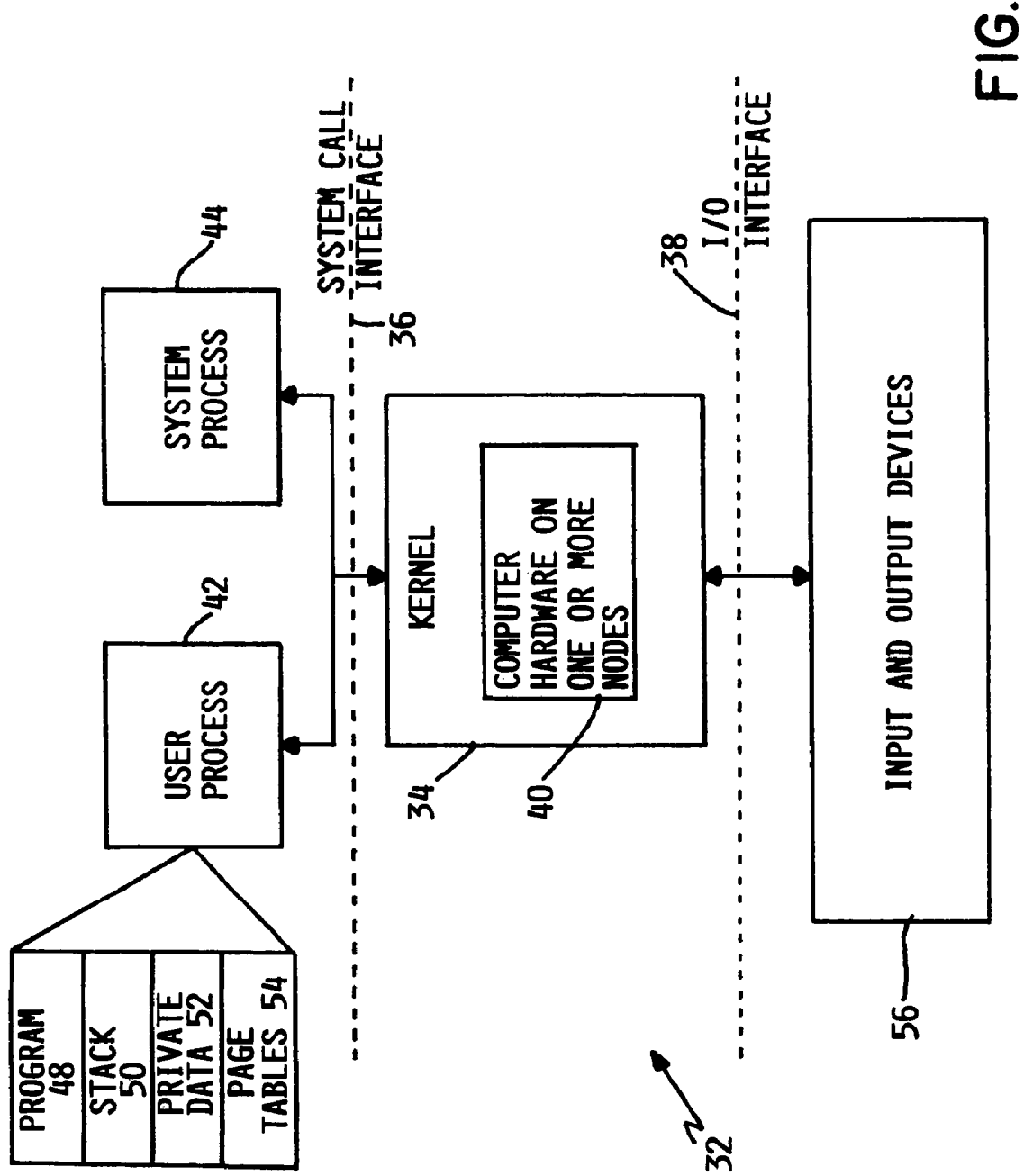
FIG. 3 is a block diagram of how an operating system for the system of FIG. 1 operates with multiple processes and input and output devices.

FIG. 3 shows an operating system 32 for computer system 10, which includes a kernel 34, a system call interface 36 and an I/O interface 38. The illustrated operating system is a UNIX-based operating system, although other operating systems may also be used. Kernel 34 (which is the heart of operating system 32) is a program stored in memory 26 on one or more nodes. Memory 26, processors 24, and other hardware shown in FIG. 2 are used for running the kernel 34 and are shown generally as computer hardware 40. Kernel 34 is responsible for controlling the computer system's resources and scheduling user requests so that each user request receives its fair share of the system resources. A system resource can be, for example, an I/O device (e.g., disk drive, tape drive, CD ROM, etc.), a shared memory segment, a file, a process, a processor, etc.

Requests are generated by one or more processes, such as user process 42 and system process 44 that run on computer system 10. User process 42 includes a part of a program 48 (i.e., instructions) and an execution environment for running the program. For example, process 42 includes several components, such as a stack 50, private data 52 for storing local variables, and page tables 54 used to define physical memory associated with the process. The page table for a process may consist of a hierarchy of such tables, and both single and multi-level page tables are represented by page table 54. Process 44 includes a similar environment to that of process 42. Although two processes are shown, any number of processes may be run at one time on the node. The processes make requests to kernel 34 through system calls which are passed to the kernel by system call interface 36. Processes execute in parallel to the extent they can be run concurrently on the different processors of system 10.

Kernel 34 accesses I/O devices 56 through I/O interface 38. For example, if process 42 requests information from a disk drive (not shown) included within I/O devices 56, process 42 makes a system call to operating system 32. Operating system 32 uses I/O interface 38 to retrieve the information from the disk drive and returns the information to user process 42.

Operating system 32 provides methods for allocating and deallocating memory for processes. For example, in UNIX the kmem_alloc primitive function is used within the kernel to allocate memory for kernel processes. The malloc library routine is used within applications to allocate memory for application processes. Other functions or routines may also be used for allocating memory.

The Memory Allocator

A memory allocator in accordance with the invention is NUMA-aware, allowing a caller such as a process to specify which node's memory is to be returned. If no node is specified in the call, the allocator defaults to the memory of the node in which the process making the call is executing. This default allows non-NUMA-aware code (which cannot specify a node) to gain some of the benefits of NUMA awareness simply by virtue of using a NUMA-aware allocator. The NUMA-aware memory allocator of the invention is thus compatible with prior non-NUMA-aware versions, and no source code changes are required to use the NUMA-aware allocator in place of a non-NUMA-aware version, such as in a UMA multiprocessor computer system.

To satisfy requests for a particular node's memory, the allocator must track which memory is homed on which node, while still maintaining full speed in the common case. (The common case is requests for memory that can be satisfied on the node (the node to which the currently executing CPU belongs) from the per-CPU pool.) Similarly, requests for a specific memory class must be honored, and so the allocator must track which memory class a given block of memory belongs to.

The allocator also allows user-space diagnostic tools to locate all structures of a given type. This is important on a large computer system, since simple linked data structures will be updated more frequently than a user-space program can traverse them. This would prevent such a program from ever successfully traversing the complete list. The allocator maintains special overhead data structures that allow such programs to find all structures of a given type.

Calling Sequence Modifications

To maintain source and object compatibility with standard calling conventions, upper bits of the flags argument in a function call in accordance with the invention are used to specify the memory class and the node. Zeros in these bits indicate the default "don't care" action should be taken, namely, allocating memory on the current node and least-DMAable memory class, but using other memory if this is unavailable. To specify a particular node, the node number (plus one) is placed into certain bits of the flags argument. To specify a particular memory class and the index of the desired memory class, other bits of the flags argument are set.

Placing a node number or a memory-class index into the flags argument is interpreted as a strict request. The request will fail or block if the requested type of memory is unavailable. One bit indicates non-strict request for memory class, so that memory of a different type will be returned if the requested memory class is unavailable. Similarly, another bit indicates a non-strict request for node, so that memory on some other node will be returned if memory on the requested node is unavailable.

Overview of Pertinent Data Structures

The memory allocator in the preferred embodiment uses a two-level overhead data structure to determine the type and size of a given block of memory. The first level is a kmem_dope_vector[] array, each entry of which tracks the virtual memory block (vmblk) (if any) that begins in the corresponding two-megabyte region of virtual memory. The kmem_dope_vector[] entries record memory class (in kmvd_mc) and node number (in kmvd_quadno), and the referenced vmblk contains only memory from the specified memory class homed on the specified node.

vmblk and kmem_dope_vector

Figure 4:
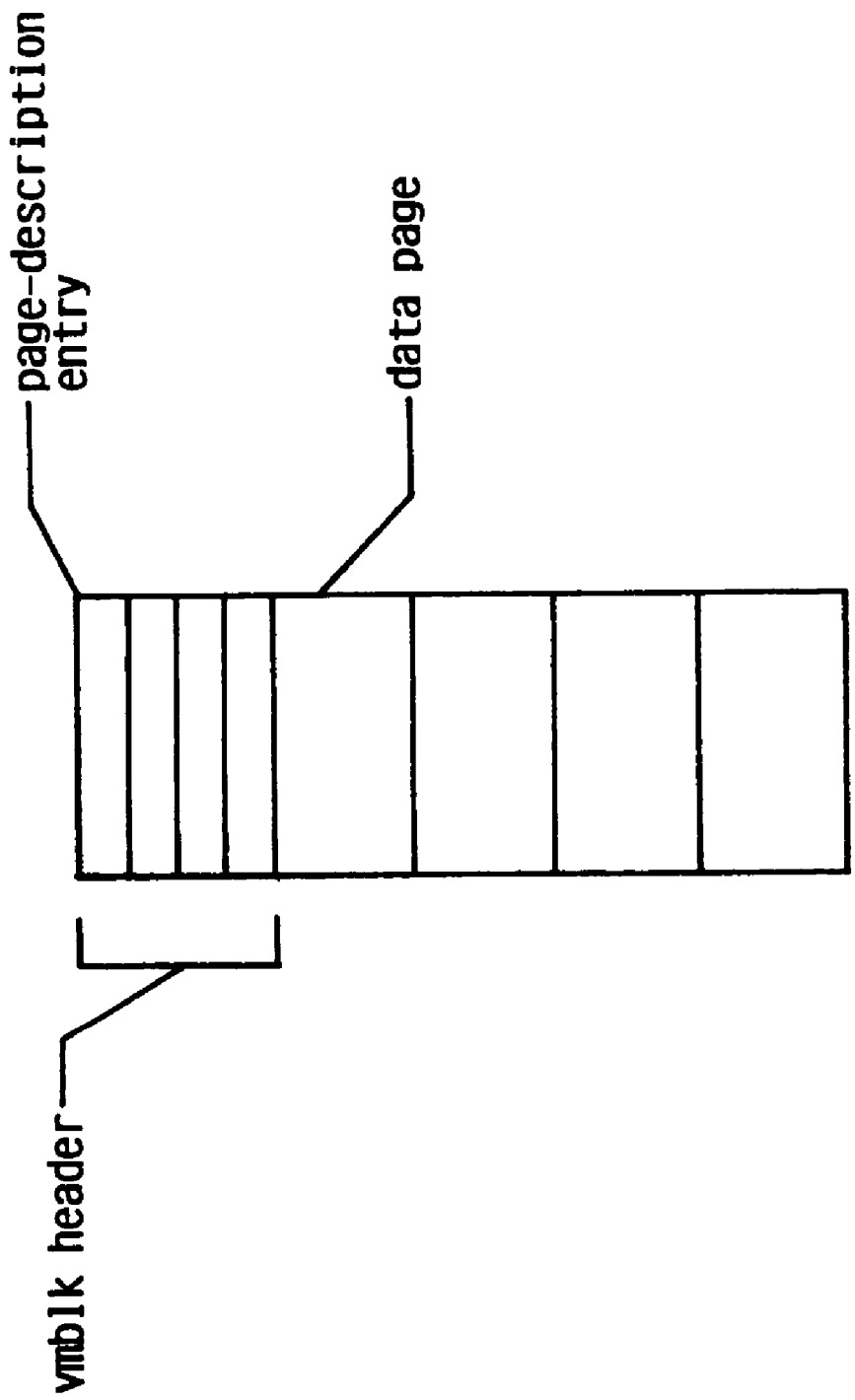
FIG. 4 is a block diagram of a virtual memory block (vmblk) data structure for memory allocation in accordance with the invention.

The central data structure is the vmblk 60, shown in FIG. 4. Each vmblk consists of a header 62, which itself is composed of an array of page-description entries 64, followed by data pages 66. There is a one-to-one correspondence between page-description entries and data pages. A given page-description entry contains information describing its corresponding data page. The actual memory given in response to memory-allocation requests is taken from the data pages. The total size of each vmblk is at least two Mbytes. The vmblks that are larger than two Mbytes are special in that they have a zero-length header, so that they are composed entirely of data pages. All physical memory in a given vmblk is preferably homed on one and only one node and is from one and only one memory class.

Given a pointer to a block of allocated memory and another pointer to its vmblk, the index of the corresponding page-description entry is computed by rounding the block pointer down to the next lower 4K-byte boundary, subtracting the address of the vmblk's first data page, and dividing by 4K (i.e., shifting right by 12 bits).

Since vmblks are not necessarily aligned on two Mbyte boundaries, a table (named kmem_dope_vector☐ in the preferred embodiment) is used to locate them. Since each vmblk is guaranteed to be at least two Mbytes in size, only one vmblk's starting address can reside within a given two Mbyte region of virtual address space. Therefore, the kmem_dope_vector☐ table need have only one entry per two Mbytes of virtual address space. To find the vmblk containing a given block of memory, follow this procedure:
 1. Divide the block's address by two Mbytes (symbol KMEM_NBVMBLK) to obtain a first guess at the index of the vmblk.
 2. If the indexed kmem_dope_vector☐ entry's kmvd_vmblk field is non-NULL and is less than the block's address, then this kmvd_vmblk field points to the desired vmblk.
 3. Otherwise, decrement the index and perform the check in step (2). If the check succeeds, we are done. If the check fails, the index is greater than zero, and if the kmvd_vmblk field is NULL, decrement and repeat step (3). Otherwise, signal an error.
 4. If the index underflows, signal an error condition.

The Coalesce-to-page Structure

Figure 5:
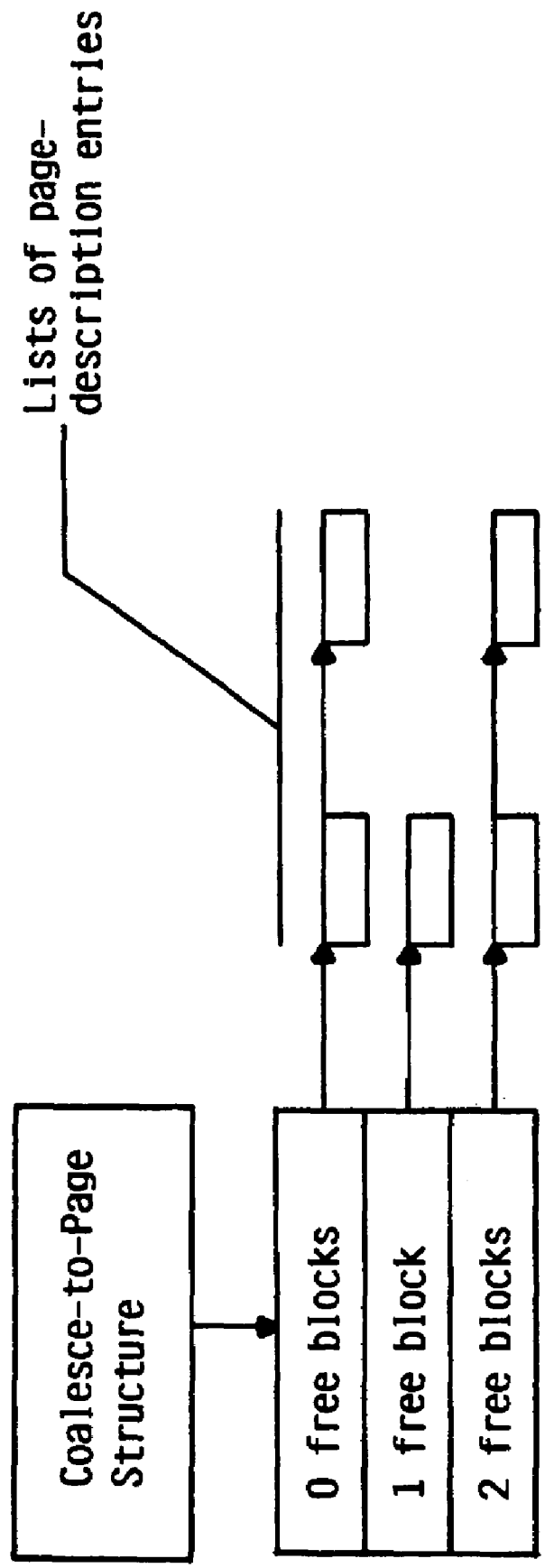
FIG. 5 is a block diagram of a coalesce-to-page data structure for memory allocation in accordance with the invention.

The vmblk and kmem_dope_vector structures are able to handle memory allocations in 4K increments. However, most allocations are for block sizes much smaller than 4K bytes. The purpose of the coalesce-to-page structure shown in FIG. 5 is to handle these smaller requests efficiently.

The coalesce-to-page structure points to a vector of list headers, one for each possible number of free blocks that can be contained within a 4K page (or multipage span, for structure pools that break up spans rather than pages). These lists each contain page-description entries corresponding to that list's number of free blocks.

When a block is freed, its page-descriptor entry is moved up to the next higher list. Similarly, when a block is allocated, it is moved down to the next lower list. This movement is performed in batches to reduce overhead.

A given memory pool has a coalesce-to-page structure for each node/memory-class/pool combination. This allows the memory allocator to keep the different memory properly segregated.

The mblk_global_t and mblk_pereng_t Structures

Figure 6A:
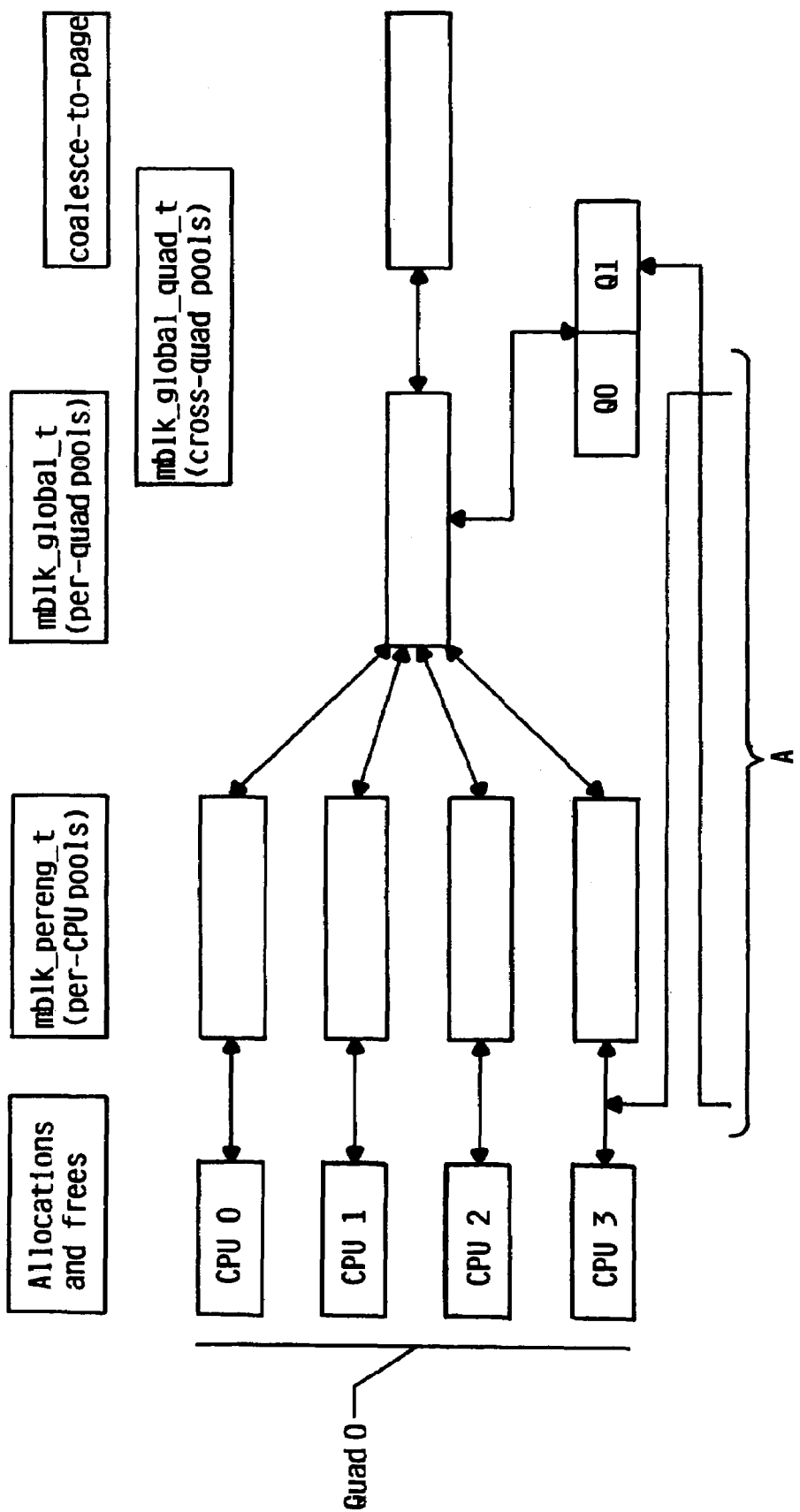
FIG. 6 shows a multi-level caching structure for memory allocation in accordance with the invention.
Figure 6B:
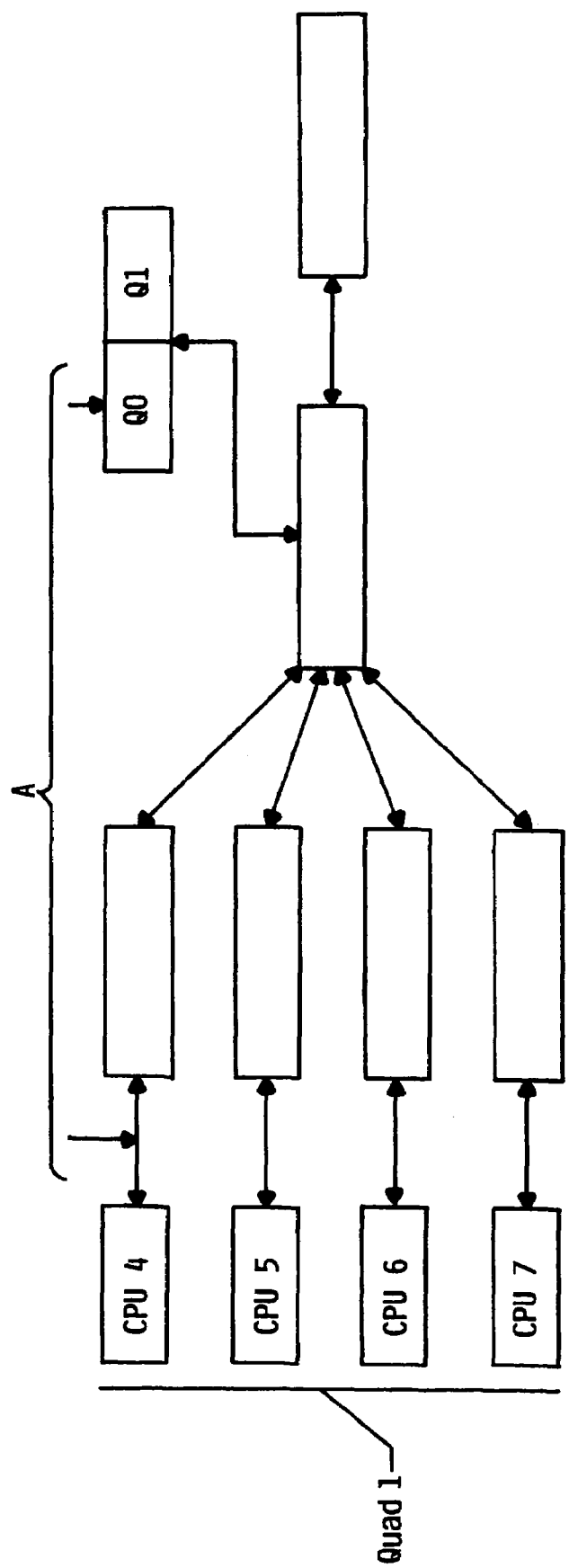

Manipulating the doubly-linked lists and acquiring the locks associated with the coalesce-to-page structure is still too expensive for common case allocation. Therefore, caching may be added in front of the coalesce-to-page structure. FIG. 6 shows the caching relationship of the data structures for a two-node, eight-CPU system with a single memory class. A machine with additional memory classes would replicate this structure for each additional memory class. All machines would replicate this structure for each kmem_alloc( ) size and for each kmem_struct pool created by kmem_struct_init( ). For the mblk_global_t and mblk_pereng_t structures:

1. There is one mblk_global_t for each node/memory-class/pool combination, instead of a single mblk_global_t for each pool. Segregating the different types of memory allows a specific type of memory to be allocated very efficiently.
 2. There is a cross-node pool (mblk_global_quad_t) for each pair of nodes (in other words, $N^2$ of them, where N is the number of nodes) that caches blocks being allocated and freed from off-node. This pool reduces the lock contention experienced by the mblk_global_t pools. Note that the above figure shows cross-node allocations and frees from only CPUs 3 and 4. In reality, any of the CPUs can and do perform cross-node allocations and frees.

The purpose of the cross-node pools is to keep memory from different memory classes and homed on different nodes strictly segregated.

Since a typical machine has nine different kmem_alloc( ) sizes, either one, two, or three memory classes, up to eight nodes (32 CPUs), and 22 different kmem_struct pools, a natural question is "how does the implementation find the correct pool?". The details of the answer differ depending on whether one is doing on-node or cross node allocation/free and on whether you are using a kmem_alloc( ) or kmem_struct( ) pool.

Locating the correct structure to allocate from or free to requires:
1. determining which CPU, node, and memory class is relevant, and
2. locating the correct pool based on this information.

These two steps are described in the following sections.

Determining Relevant CPU, Node, and Memory Class

The first step, determining the relevant CPU, node, and memory class, is handled in three separate cases:
1. Allocation from kmem_alloc( ) pools.
2. Allocation from kmem_struct( ) pools (created by kmem_struct_init( )).
3. Freeing from either kmem_alloc( ) or kmem_struct( ) pools.

These cases are described in the following sections.

Determining Relevant CPU, Node, and Memory Class for kmem_alloc( ) Allocation

The kmem_alloc( ) primitive extracts the relevant node and memory class from its flags argument. If the upper 32 bits of the flags argument are all zero, then the current node (the node to which the currently executing CPU belongs) and the least-DMAable memory class are selected. Otherwise, the node and memory class are extracted from the flags word as described below.

If the current node is selected, then the current CPU is also selected. Otherwise, this is a cross-node allocation, and the CPU is not relevant.

Determining the Relevant CPU, Node, and Memory Class for kmem_struct( ) Allocation The kmem_struct_alloc( ) primitive extracts the relevant node from its flags argument and the relevant memory class from the creating kmem_struct_init( )'s structflags argument. Note that per-allocation selection of the memory class is not allowed for kmem_struct alloc( ), because a given kmem_struct( ) pool is constrained to contain only one memory class. As with kmem_alloc( ), specifying zeros for memory-class and node fields causes the current node (the node to which the currently executing CPU belongs) and the least-DMAable memory class to be selected. Otherwise, the node is extracted from the kmem_struct_alloc( ) flags argument and the memory class is extracted from the kmem_struct_init( ) structflags argument as described below.

As with kmem_alloc( ), if the current node is selected, then the current CPU is also selected. Otherwise, this is a cross-node allocation, and the CPU is not relevant.

Determining the Relevant CPU, Node, and Memory Class for Freeing

A user of kmem_free( ) and of kmem_struct_free( ) is not required to keep track of either the home node or the memory class of the memory being freed. Therefore, these primitives must determine this information given only a pointer to the memory being freed.

They make this determination by looking up the kmem_dope_vector[] entry corresponding to the memory being freed. This entry is located using the procedure described below. The entry contains the kmvd_quadno and kmvd_mc fields, which specify the home node and memory class, respectively, for the memory being freed. Note that kmem_struct_free( ) does not need to explicitly determine the memory class, because a given kmem_struct( ) pool's memory must all belong to one memory class.

As with allocation, if the memory is homed on the current node, then the current CPU is selected. Otherwise, this is a cross-node free, and the CPU is not relevant.

Locating the Correct Pool

Although the interrelation of the mblk_pereng_t and mblk_global_t data structures is identical for kmem_alloc( ) and kmem_struct_alloc( ), the two primitives differ in how they locate these data structures given the relevant CPU, node, and memory class. Going forward, there will likely be more commonality in the node-selection portions of these two sets of primitives. Described herein is the current rather than ideal state.

The following two sections describe the location procedure for kmem_alloc( ) and kmem_struct_alloc, respectively.

Locating Correct Pool for kmem_alloc( )

Figure 7A:
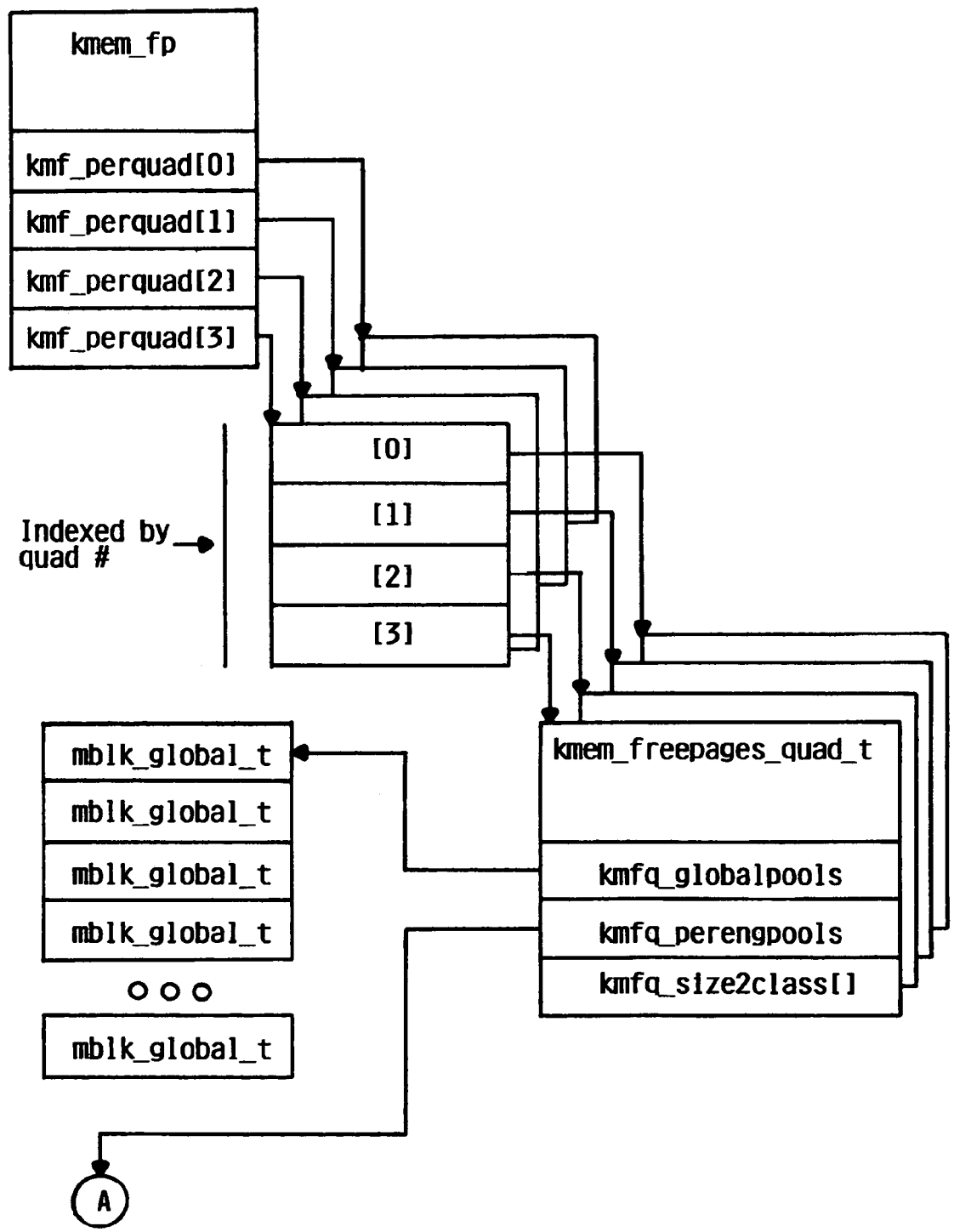
FIG. 7 is a block diagram of data structures used for finding memory pool structures.
Figure 7B:
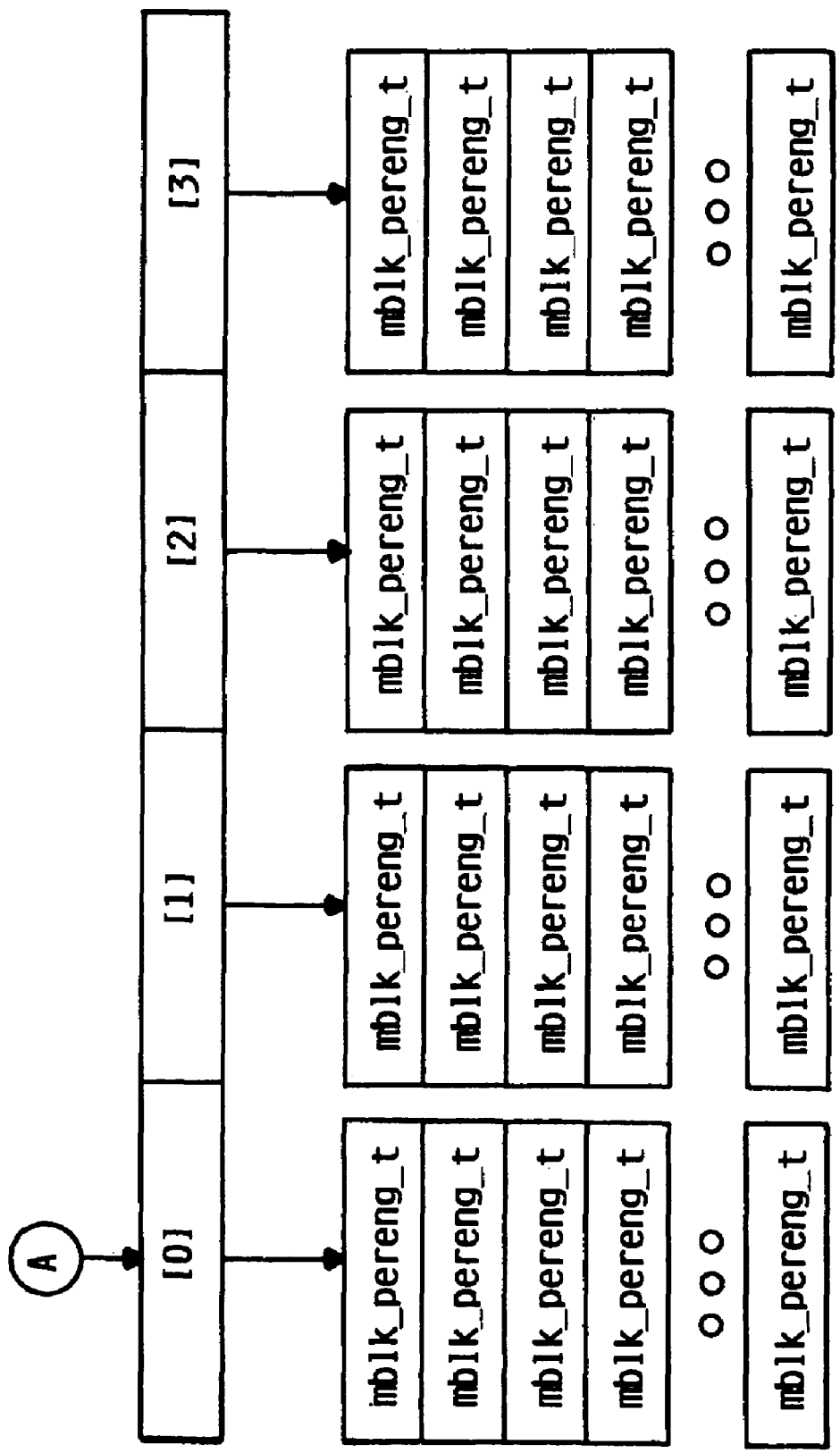

Referring to FIG. 7, the kmem_alloc( ) primitive's search for the correct pool starts from the kmem_fp global structure, and goes through the shown structures. Note that kmem_free( ) follows the same search path that kmem_alloc( ) does, the only difference being that kmem_free( ) must use a different method to determine the relevant CPU, node, and memory class.

The kmem_alloc( ) primitive starts with the kmem fp global variable. It uses the selected memory class to index the kmf_perquad[] array contained within this structure, and uses the selected node to index the array pointed to by the selected element of the kmf_perquad[] array. This selects the kmem_freepages_quad_t structure that corresponds to the desired memory class and node. Note that if there are two memory classes and six nodes, then there will be twelve distinct kmem_freepages_quad_t structures. In order to simplify the diagram, only those structures for one memory class are actually shown on the diagram.

Note that the C language's syntax means that "kmem_fp.kmf_perquad[memclass][quadno]" will yield a pointer to the correct kmem_freepages_quad_t structure. The next step is to divide the request size by sixteen, rounding up, and to use the result to index the kmfq_size2class array. This will give the kmem_alloc( ) "class" of memory. The idea is that kmem_alloc( ) only provides a few sizes of memory, and requests are rounded up to the next provided size. Since sizes can be arbitrary multiples of sixteen, the kmfq_size2class[] array provides a convenient way to map from the size to the class.

If the selected node is the same as the current node, the mblk_pereng_t per-CPU pool is used. This structure is located by following the kmfq_perengpools pointer to a per-CPU array of pointers to arrays of mblk_pereng_t structures. The index of the current CPU within its node is used to select the pointer from the array (for example, CPU 5 would have index 1 within node 1, and CPU 8 would have index 0 within node 2). The kmfq_size2class[] element is then used to index the referenced array of per-size mblk_pereng_t structures.

Figure 8:
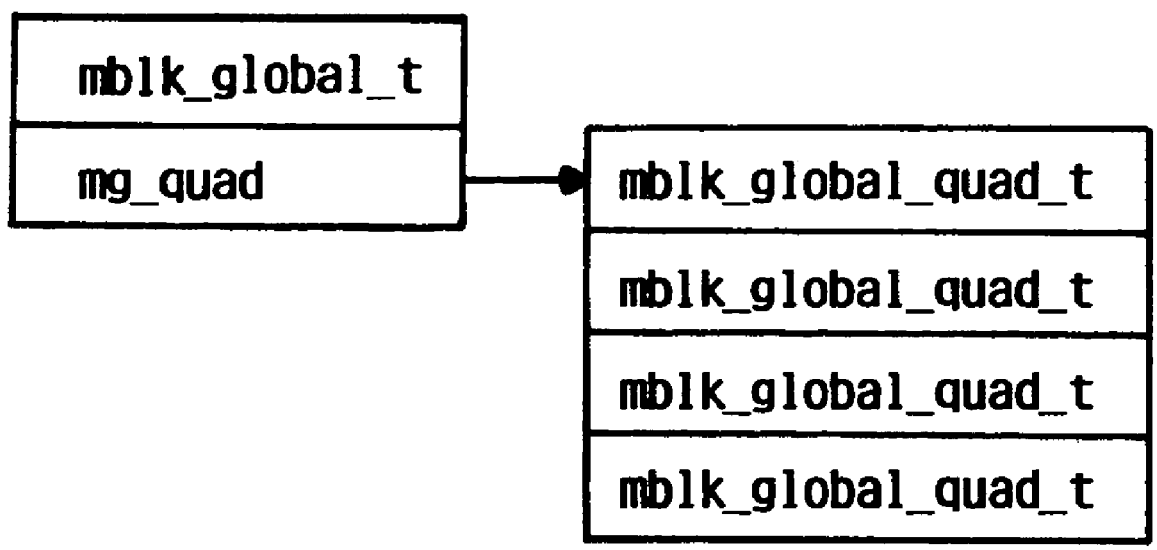
FIG. 8 is a block diagram of additional data structures according to the invention.

If the selected node is not the current node, a cross-node allocation is being done. This means that the proper mblk_global_quad_t must be located. An array of these is pointed to by the mg_quad field of the mblk_global_t. The mblk_global_t is selected by following the kmfq_globalpools pointer, and using the kmfq_size2class[] element to index the referenced array of per-size mblk_global_t structures. One then selects the mblk_global_quad_t from this array by using the current node number as index, then allocates or frees a block from/to this mblk_global_quad_t for kmem_alloc( ) and kmem_free( ), respectively. FIG. 8 shows how a mblk_global_t references the array of mblk_global_quad_t structures.

Locating the Correct Pool for kmem_struct_alloc( )

Figure 9:
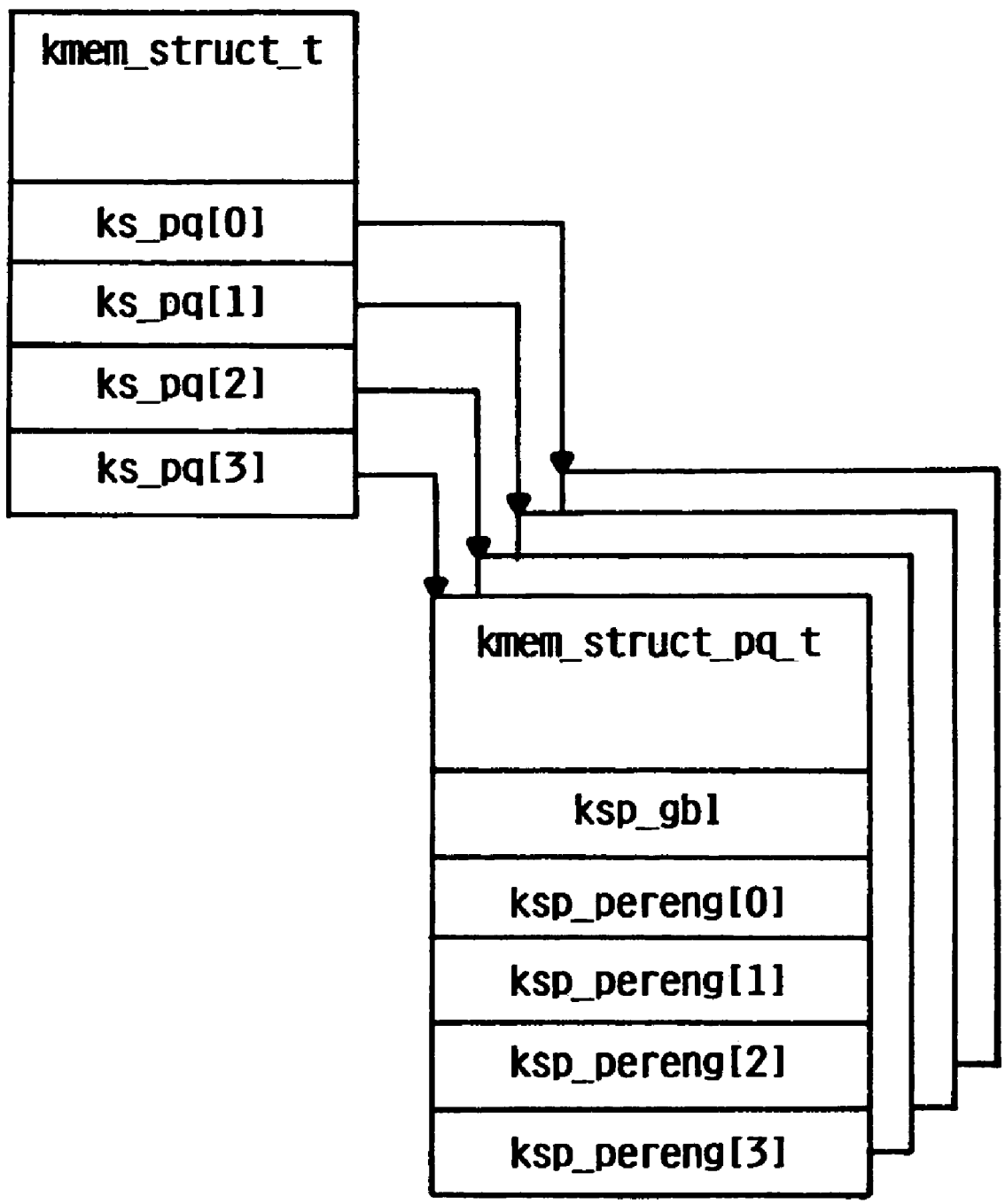
FIG. 9 is a block diagram showing the memory layout of certain data structures in the memory pool.

The kmem_struct_alloc( )/kmem_struct_free( ) case is much simpler, because the memory class is implicit in the kmem_struct( ) pool itself and because a given kmem_struct( ) pools supports one and only one size. The pointer returned from kmem_struct_init( ) points to a group of structures connected to a kmem_struct_t as shown in FIG. 9.

The kmem_struct_t contains global state and an array of pointers to. the per-node kmem_struct_pq_t. These are allocated separately in order that each kmem_struct_pq_t may be homed in its node's memory. The mblk_global_t and mblk_pereng_t, however, are aggregated into the enclosing kmem_struct_pq_t as the ksp_gbl field and the ksp_pereng[] array, respectively.

So, kmem_struct_alloc( ) simply uses the selected node to index the ks_pq[] array within the referenced kmem_struct_t. If the selected node is the same as the current one, it uses the index of the current CPU within the node to select the mblk_pereng_t element from the ksp_pereng[] array.

Otherwise, one is doing a cross-node free and must find the proper mblk_global_quad_t. Just as with kmem_alloc( )/kmem_free( ), a per-node array of these structures is pointed to by the mg_quad field of the mblk_global_t, which in the case of kmem_struct_alloc( ), is embedded as the ksp_gbl field within the kmem_struct_pq_t. The current node is used to index the array of kmem_struct_quad_t structures, as shown in FIG. 8.

Block-Pointer Blocks

Figure 10A:
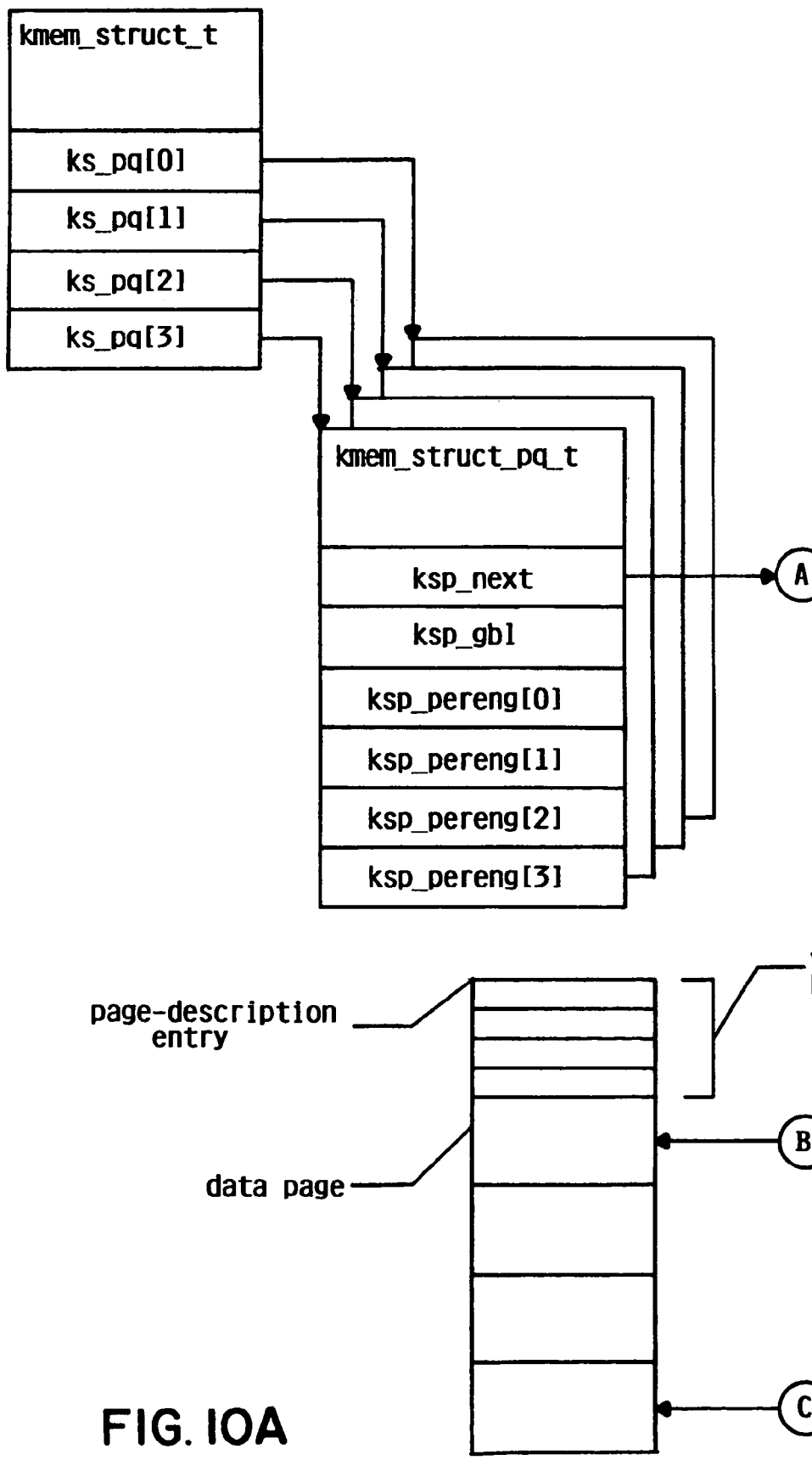
FIG. 10 is a diagram of block-pointer blocks.
Figure 10B:
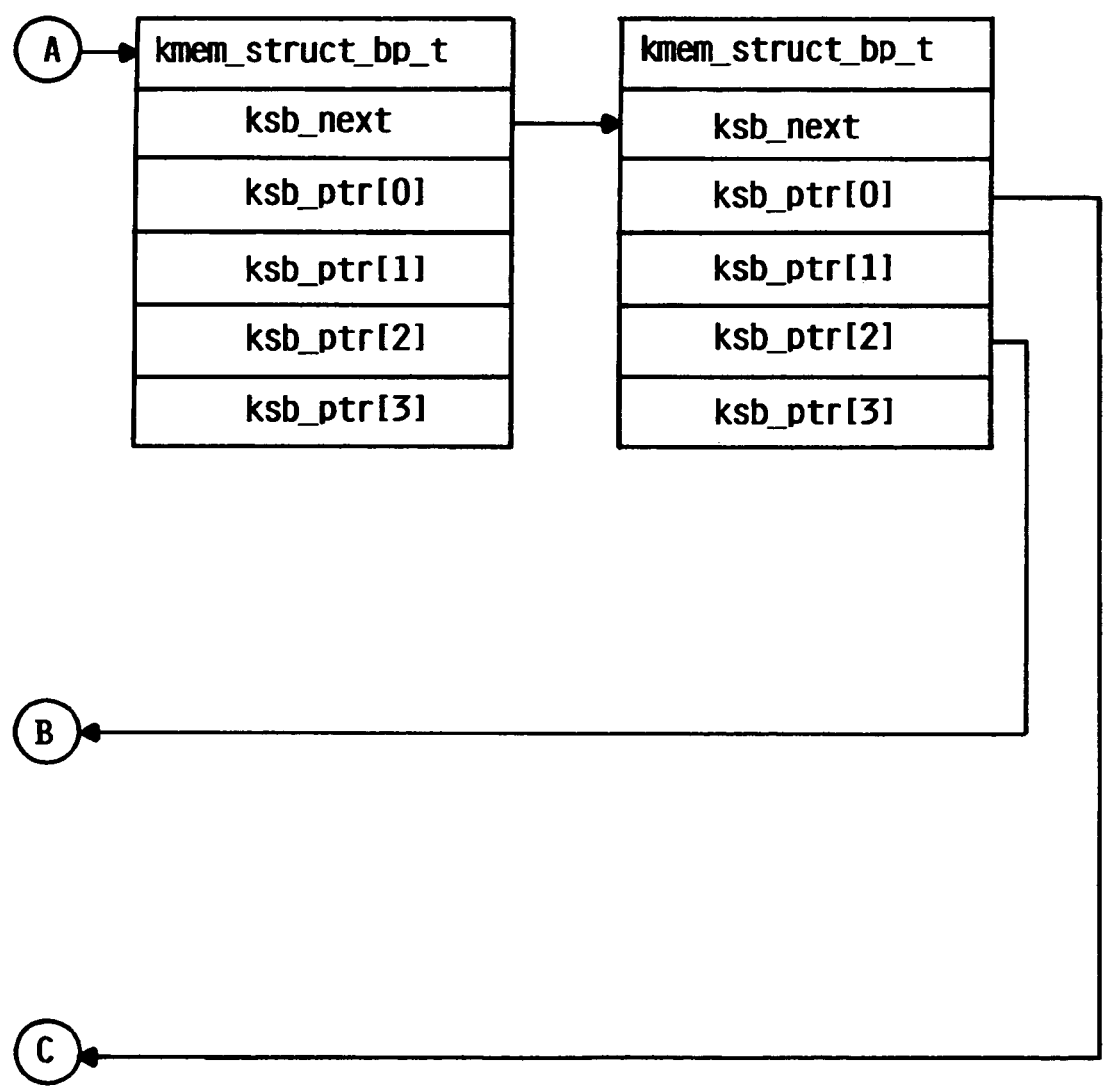

Since the actual memory in a given pool is dynamically allocated, and can be freed to the virtual memory subsystem at any time, extra overhead structures are required to enable user-level diagnostic tools to successfully locate all structures belonging to that pool. If the typical approach of linking the structures together is used, then the user-level program has almost no chance of successfully traversing this list before it changes. If another traditional approach of providing a kernel interface with locking is used, then the locking overhead incurred adding and removing structures becomes prohibitive. This invention circumvents these problems by tracking pages of structures using blocks of pointers, as shown in FIG. 10.

Each of the per-node kmem_struct_pq_t structures has a ksp_next pointer that points to a linked list of kmem_struct_bp_t structures. Each of these kmem_struct_bp_t structures contains an array of pointers, and these pointers point to each of the data pages containing structures belonging to this kmem_struct( ) pool.

Use of this structure means that the linked list traversed by the user application changes only when one of the kmem_struct_bp_t structures is removed from its list. This in turn will only happen after a considerable number of data pages are coalesced and returned to the virtual memory subsystem. Therefore, the user application has an excellent chance of safely traversing the list. In addition, the locks guarding the list of kmem_struct_bp_t structures have very low contention, so a kernel interface also becomes practical for those applications that cannot tolerate stale data.

In addition, each node has its own list of kmem_struct_bp_t's attached to that node's kmem_struct_pq_t.

Distributed Reference Counters

It is often necessary to provide "farewells" that prevent any given type of structure from consuming all of memory. This in turn requires maintaining an accurate count of the number of structures that have been allocated. However, straightforward ways of accomplishing this would exact an unacceptable performance penalty in the common case:
1. Using a counter protected by a lock results in unacceptable synchronization overhead.
2. Using atomic operations to manipulate a shared counter results in unacceptable cache-miss overhead.
3. Using separate counters per CPU or per node results in unacceptable cache-miss overhead summing up the individual counters.
4. Combining-tree algorithms require explicit cooperation from other CPUs to calculate the result. However, the overhead of interrupting and communicating with these other CPUs, to say nothing of waiting for them to finish, is unacceptable.

The solution is to maintain per-CPU Acaches≅ of counter Avalue,≅ combined with a recognition that what is important is whether the value is within a predetermined range rather than an exact value. Careful replenishing of these caches can guarantee that as long as the cache contains "value", removing some of that value will not result in underflow, and, similarly, that as long as there is room in the cache for more value, adding value will not result in overflow.

Since the common case does not involve either overflow or underflow, the common case can take advantage of high-speed access to the per-CPU "cache" of "value".

Figure 11:
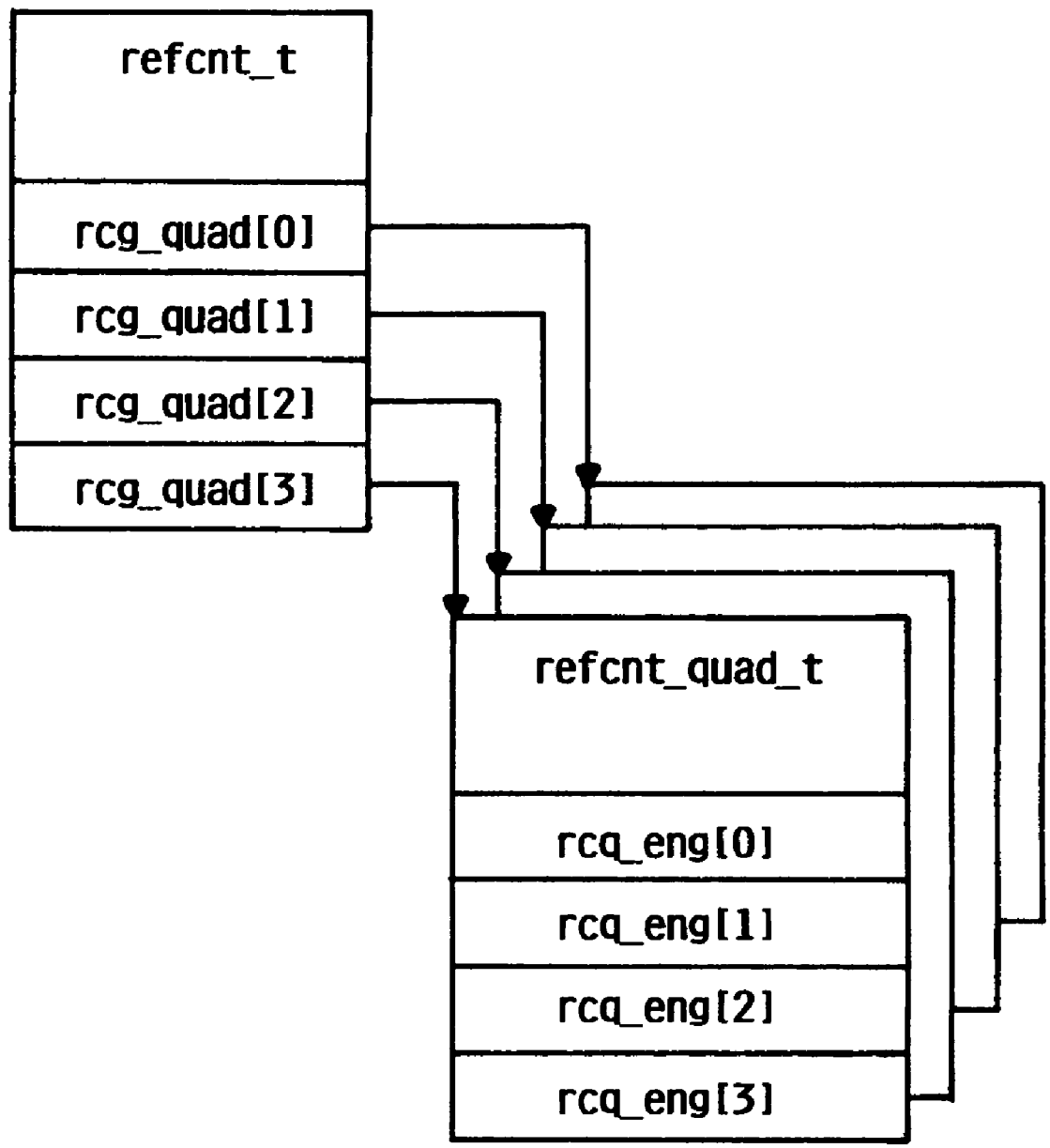
FIG. 11 is a block diagram of a distributed reference counter in accordance with the invention.

The structure of a distributed reference counter is as shown in FIG. 11.

The rcq_eng☐ array is an array of per-CPU refcnt_eng_t structures, which hold "value" cached for the corresponding CPU.

The refcnt_t contains the predetermined limits, the desired level of value in the node and CPU caches, and the leftover value that is not contained in any of these caches. This leftover value is not allowed to decrease below one if there is any value in any of the caches. The refcnt_t also contains pointers to each of the refcnt_quad_t structures. These are allocated separately so that each node's refcnt_quad_t may be homed on that node's memory. The desired levels of value in the node and CPU caches are dynamically varied based on the distance between the total value and the limits. This allows greater efficiency when far from the limits and adequate accuracy near the limits.

The refcnt_quad_t contains the per-node cache of value, and the refcnt_eng_t's (which contain the per-CPU caches) are aggregated into the enclosing refcnt_quad_t. In the common case, a CPU wishing to increment or decrement the value represented by a given refcnt_t need only access its own refcnt_eng_t structure. The resulting cache locality greatly speeds increments and decrements, resulting in order-of-magnitude speedups over the more conventional use of atomic instructions.

Figure 12:
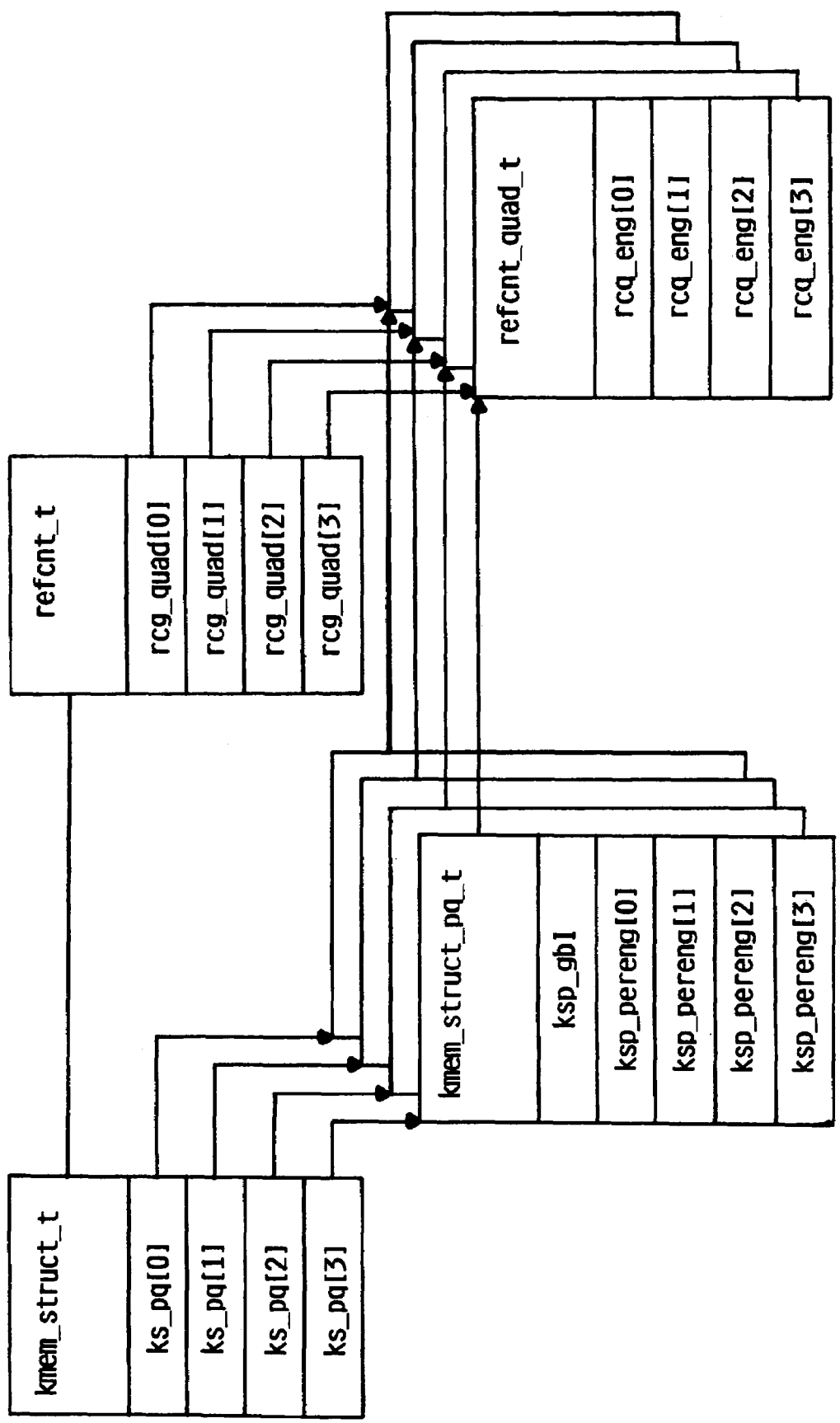
FIG. 12 is a block diagram showing the relationship between a structure pool and a distributed reference count.

The relation of a structure pool and a distributed reference counter is shown in FIG. 12. The direct links from the kmem_struct_pq_t to the refcnt_quad_t allow a CPU to adjust the counter represented by the refcnt_t (to allow for allocation or freeing of memory) without referencing off-node memory in the common case, thereby greatly reducing overhead.

In addition, the common-case access to the distributed reference counter is lock-free (using an atomic compare-and-exchange operation), thereby speeding access.

Other Uses for Distributed Reference Counters

The objective is to generate transport protocol packets at a rate limited by the ability of a network interface card to transmit them. Packets will be generated at multiple locations within a NUMA computer system, each with a different offered load, yet one must control the global rate without limiting local rates unnecessarily.

One solution is to issue credits for packet generation to be consumed globally on a first-come, first-served basis. The credit generator must monitor the capacity of the network interface card (NIC) and the level of outstanding credits to calculate the rate of new credit generation. The distributed reference count is a mechanism for efficient distribution for credits to the locations that are actively consuming them, and for monitoring the level of outstanding credits.

Improvements to the above-described embodiment are listed below. There is no longer a limit to the amount that a refcnt_t can be incremented by the refcnt_incr( ) (or refcnt_decr( )) primitives. The concept of a Abias≅ has been added. There is a primitive named "refcnt_bias( )" that returns an appropriate bias given a pointer to refcnt_t. The concept of a reached-zero callback function has been added. There is a primitive named refcnt_callback_set( ) that adds a specified callback function and argument to a specified refcnt_t. Either or both the function and argument may be modified. There is another primitive named refcnt_callback_get( ) that returns the callback function and/or argument currently registered. Registering a NULL function disables the callback capability. If there is a valid function registered, it will be invoked whenever the corresponding refcnt_t is decremented to zero.

Other improvements included the following. The usage of refcnt_t has been extended to cover certain cases such as counting the number of I/Os outstanding on a particular device. The old form and usage model for refcnt_t did not lend itself to this situation because the number of outstanding I/Os to a single device will usually be quite small, too small to spread some of the count over all of the CPUs and nodes like refcnt_t needs in order to operate efficiently. However, it is only necessary to know the exact number of outstanding I/Os when shutting the device down. So, bias is added to the refcnt_t to allow efficient operation. When shutting the device down, this same bias is subtracted from the refcnt_t. When the refcnt_t reaches zero, there are no more outstanding I/Os, and the device maybe safely shut down. (Other mechanisms are use to prevent new I/Os from being posted to the device.) The new refcnt_bias( ) primitive maybe used to select an appropriate bias.

Sometimes it is necessary to take a particular action when a counter reads a particular value, but to guarantee that the counter does not change while the action is taking place. The usual way to implement this is to guard the counter with a simple spinlock. However, this implementation is subject to high contention (and therefore poor performance) under heavy load. Since the whole point of using a refcnt_t was to attain good performance under heavy load, this solution would be self-defeating.

Therefore, the refcnt_t should instead be guarded with a reader-writer spinlock implemented so as to allow very high read-side contention.

The reader-writer spinlock allows multiple CPUs to read-acquire it simultaneously. However, only one CPU at a time may write-acquire it. Write-acquisitions are blocked until all readers release the lock. Once a writer starts acquisition, all subsequent read-acquisitions are blocked until the writer releases the lock.

So, the way to use refcnt_t to ensure that it does not change while a particular action is taking place is as follows:
1. To simply count:
   a. Read-acquire the reader-writer spinlock.
   b. Increment or decrement the counter by the desired amount.
   c. Release the reader-writer spinlock.
2. To check the value and atomically perform some action:
   a. Write-acquire the reader-writer spinlock.
   b. Check the value of the refcnt_t. If it has the desired value, perform the action.
   c. Release the reader-writer spinlock.

This use is unusual in that the reader-writer spinlock is read-acquired to write the refcnt_t and writer-acquired to read the refcnt_t.

The purpose of the reader-writer lock primitives is to allow efficient locking of data structures that are referenced very frequently but that are modified very infrequently. Examples of such a data structure are the routing tables and connection control-block lists present in most communications protocols. These structures must be accessed for each packet sent and/or received, but are modified only when routing updates are received (for the routing table) or when connections are established or torn down (for the connection control-block lists).

These spinlocks are subject to restrictions. If the critical sections are lightly contended, reader/writer spinlocks will not promote a performance advantage unless the workload will read-acquire the lock at least 2N times as often as it write-acquires the lock, where AN≃' is the maximum number of CPUs that can be configured on the system.

If the critical sections are heavily contended, reader/writer spinlocks will not provide much performance advantage unless the workload will read-acquire the lock at least twice as often as it write-acquires the lock, and the read-side critical sections execution time is long compared to that of the write-side critical sections. Performance can be improved even more by redesigning the code to reduce lock contention, particularly write-side lock contention. Nevertheless, reader/writer locking can be an easy fix for performance problems due to read-side lock contention.

Read-copy locking outperforms reader/writer locking in almost any situation where read-copy locking can be used and where reader/writer locking would outperform straight_p_lock( )/v_lock( ) locking. Read-copy locking can be used when writers make modifications such that the data structure is in a consistent state at all times (or the write-side code can be converted to the read-copy form); readers can tolerate stale data; writers can tolerate the write-side latency imposed by read-copy locking (e.g., because they are using of the kmem_deferred_free( ) family of primitives; or there are at least four times (and preferably at least 100 times) as many readers as there are writers.

CPUs wishing to read-acquire a rwlock_t perform the following operations:
1. Adjust SPL.
2. Atomically increment the counter within the rwlock that corresponding to this CPU. If the result of the increment is zero:
3. Atomically decrement the counter.
4. Drop the SPL.
5. Spin until the value of the counter is zero.
6. Restart this procedure from the top.
7. If the result of the increment is greater than zero, continue. If the result of the increment is negative, panic.
8. Enter reader-critical section.

Note that this procedure does not touch any data shared with other CPUs, thereby entirely avoiding cache-thrashing.

CPUs wishing to write-acquire a rwlock_t perform the following operations:
1. Acquire a per-rwlock_t lock_t. This serializes multiple writers going for the same rwlock.
2. Adjust SPL.
3. Atomically decrement each counter within this rwlock_t. This will prevent any new readers from acquiring this rwlock_t, although it will not affect any readers currently holding the rwlock_t.
4. Spin until each counter within the rwlock_t has been seen with a value of −1.
5. Enter writer-critical section.

Note that this operation is quite expensive compared to more traditional lock implementation. Therefore, this implementation should only be used for applications such as routing tables or connection tables where reads are much more frequent that writes.

Regarding memory layout, the idea is to construct a reader-writer lock from N normal spinlocks, where "N" is the number of CPUs present on the system. A reader acquires the lock for corresponding to the CPU he is running on, while a writer acquires all locks, starting with CPU 0's lock. To prevent cache-thrashing in the normal (readers-only) case, each CPU's spinlocks are kept in separate cache lines. Thus, a single instance of a reader-writer lock consists of N bytes separated by the width of a cache line.

A pointer to a rwlock will be a pointer to CPU 0's lock within the rwlock. To conserve memory, separate reader-writer locks may be interlaced, so that a given cache line holds spinlocks from several different reader-writer locks for a given CPU. This interleaving is controlled by the initialization, which allocates the locks from a larger block of memory and returns a pointer to the counter for the CPU 0.

Each block is one page in size (such as 4096 bytes), and has a cache-line sized header and a number of groups.

The block header is an rwlock_blkhdr_t, and contains the following fields:
NEXT: Pointer to next block header in the freelist.
PREV: Pointer to previous block header in the freelist.
FREE: Pointer to the first free rwlock_t in this block. Free rwlock_t's are linked through their CPU-0 counters.
F.CT: Can-free byte, pad byte, and count of free rwlock_t's in this block. The can-free byte, if set, indicates that the block may be returned to the system via kmem_free when all rwlock_t's it contains are freed.
ALCT: Cumulative number of allocations from this block.
FRES: Cumulative number of frees to this block.
. . . . : Pad bytes.

Each group contains a cache-line sized header, a set of eight rwlock_t's, and a set of lock-hierarchy pointers.

The group header is an rwlock_grphdr_t, and contains the following fields:

WWWW: A set of eight lock_t's, one for each rwlock_t in this group. These locks are used to serialize multiple writers trying to acquire the same rwlock_t simultaneously. This in turn prevents the additional writers from thrashing the reader counters.

F . . . : A flag byte, currently containing only an inuse flag, followed by three bytes of padding.

. . . . : Four more words of pad bytes. Two of these will be consumed if the size of a lock_t increases to two bytes (as it might in order to allow p_lock( ) use a more efficient code sequence based on the "lock; btsl" instruction).

BHDR: A pointer to the block header. One could imagine an implementation that omitted this pointer in favor of chopping the lower twelve bits off the pointer to locate the block header. However, the block header pointer allows the size of the rwlock blocks to change if needed and also avoids wasting a half-page (on the average) when a set of rwlocks are allocated at startup via calloc or kmem_alloc_aligned.

The cache lines immediately following the group header contain the eight rwlock_t's. Each rwlock_t occupies one long word in each cache line. This organization results in each CPU's counters being gathered into a single cache line, thereby eliminating cache thrashing on read locks.

The final cache line of the group contains pointers to the lock-info structures for each of the rwlock_t's.

Pseudo Code

Note that there is a separate "global" pool for each node (now called a per-node pool), in contrast to the prior scheme where the global pool really was global. Note also that memory for a given node/memory-class combination is segregated into data structures intended to handle that node and memory class. Allowing the different types of memory to mix would make it impossible to efficiently allocate memory of a given type.

Pseudo Code for Allocation

TABLE 1

Pseudo-code for the allocation operation appears in Table 1 below:

1. Select the set of data structures corresponding to the desired memory class (for general-purpose allocation only).
2. If the allocation is for memory homed on this node:
3. If there is memory in this CPU's mblk_pereng_t mp_main stack, atomically pop an element off with interrupts disabled and return it to the caller. This atomic operation is described in more detail below. Other operations are protected by more conventional use of locks.
4. Otherwise, if there is memory in this CPU's mblk_pereng_t mp_aux stack, move the mp_aux stack to the mp_main stack, pop off an element, and return it to the caller (all with interrupts disabled).
5. Otherwise, locate this node's mblk_global_t for further processing.
6. Further processing proceeds in a known manner, except that this node's mblk_global_quad_t will be flushed under low-memory conditions (in addition to the mblk_pereng_t flushing described in the reference). In addition, when a new page is split up, a kmem_struct_bp_t entry will be pointed at the newly split page in order to allow the memory in this pool to be tracked.
7. Otherwise, the allocation is for memory homed on some other node:
   a. Locate the mblk_global_quad_t array for the other node.
   b. Locate the entry in this array corresponding to the requesting node.
   c. If there is memory in the mgp_main stack, pop an element off and return it to the caller.

TABLE 1-continued

Pseudo-code for the allocation operation appears in Table 1 below:

d. Otherwise, if there is memory in the mgp_aux stack, move it to mgp_main, pop an element off, and return it to the caller.
   e. Otherwise, locate the other node's mblk_global_t for further processing.
   f. Further processing proceeds in a known manner, except that this node's mblk_global_quad_t will be flushed under low-memory conditions (in addition to the mblk_pereng_t flushing described in the reference). In addition, when a new page is split up, a kmem_struct_bp_t entry will be pointed at the newly split page in order to allow the memory in this pool to be tracked.

Pseudo Code for Free

TABLE 2

Pseudo-code for the free operation appears in Table 2 below:

1. Select the set of data structures corresponding to the desired memory class (for general-purpose allocation only).
2. If freeing memory homed on this node:
   a. If there is space in this CPU's mblk_pereng_t mp_main stack, atomically push the memory onto it with interrupts disabled and return to the caller. This atomic operation is described in more detail below. Other operations are protected by more conventional use of locks.
   b. Otherwise, if this CPU's mblk_pereng_t mp_aux stack is empty, move the mp_main stack to the mp_aux stack, push the memory onto the newly-emptied mp_main, and return to the caller (all with interrupts disabled).
   c. Otherwise, locate this node's mblk_global_t for further processing.
   d. Further processing proceeds in a known manner. However, when a page is coalesced and returned to the virtual memory system, the corresponding kmem_struct_bp_t entry is removed.
3. Otherwise, the allocation is for memory homed on some other node:
   a. Locate the mblk_global_quad_t array for the other node.
   b. Locate the entry in this array corresponding to the requesting node.
   c. If there is space in the mgp_main stack, push the memory to be freed onto it and return to the caller.
4. Otherwise, if there is space on the mgp_aux stack, move the contents of mgp_main to mgp_aux, and push the newly freed memory onto the newly-emptied mp_main, and return to the caller.
5. Otherwise, locate the other node's mblk_global_t for further processing.
   a. Further processing proceeds in a known manner. However, when a page is coalesced and returned to the virtual memory system, the corresponding kmem_struct_bp_t entry is removed.

Common-Case Lock-Free Per-CPU Pool Access

Another specific difference from the prior scheme is the implementation of lock-free access to the mblk_pereng_t per-CPU pool. The prior scheme uses a method where the pool is Aowned≅ by the corresponding CPU so that no CPU may access or modify any other CPU's pool. However, this restriction is unacceptable in practice, because all memory must be allocatable in low-memory situations, even if it resides in some other CPU's mblk_pereng_t pool. Therefore, this invention uses a different locking model such that:

1. A CPU may access the mp_main portion of its own mblk_pereng_t pool, but only if it has interrupts disabled and either uses special mblk_stk_push_atomic( ) and mblk_stk_pop_atomic( ) primitives shown in Tables 3 and 4 or holds that pool's gate (PTX-specific type of mutual-exclusion primitive).

2. A CPU may remove all (not some, but all) blocks from the mp_main list of some other CPU's mblk_pereng_t pool, but only if it holds that pool's gate and uses the special mblk_stk_popall_atomic( ) primitive shown in Table 5.

The mp_aux portion of the per-CPU pools is guarded by mp_gate, using a conventional locking protocol. Since mp_aux is referenced infrequently, the overhead of acquiring and releasing mp_gate is not significant.

The mblk_stk_pop_atomic( ) primitive may only be used by a CPU on its own pool. Since interrupts must be disabled while using it, the only possible race is with some other CPU doing an mblk_stk_popall_atomic( ). After such a race, the pool will be empty. Therefore, if the atomic_cmpxchg_ulong( ) fails, the stack must necessarily be empty, so the mblk_stk_pop_atomic( ) primitive can safely simply return NULL in this case. Note that the count of the number of elements in the stack is adjusted with a separate atomic instruction. This means that the count and the actual number of elements in the list can disagree at any given point in time. Guaranteed consistent values can be observed by a CPU in its own pool, but only if it holds mp_gate.

TABLE 3

```
#define mblk_stk_pop_atomic(stk, elem) \
    ((((elem) = (stk)->mst_head) == NULL) \
        ? (mblk_t *)NULL \
        : ((atomic_cmpxchg_ulong((ulong_t *)&((stk)->mst_head), \
                (ulong_t)(elem), \
                (ulong_t)(elem)->b_cont) \
            ? (void_atomic_dec_ulong(&((stk)->mst_cnt)), \
                (elem) \
                ) \
            : ((elem) = NULL)) \
        ) \
    )
```

The mblk_stk_push_atomic( ) primitive also may only be used by a CPU on its own pool with interrupts disabled. However, the race with mblk_stk_popall_atomic must be handled specially, since a block may be added to an empty pool. But once the pool is emptied, it will stay emptied. This is because the only CPU that can legally fill it is the CPU that owns the pool, and it will not do so until after it has completed the mblk_stk_push_atomic( ). Therefore, if the first atomic_cmpxchg_ulong( ) fails, the second is guaranteed to succeed, as shown in Table 4.

TABLE 4

```
#define mblk_stk_push_atomic(stk, elem) \
{ \
    (elem)->b_cont = (stk)->mst_head; \
    if (atomic_cmpxchg_ulong((ulong_t *)&((stk)->mst_head), \
            (ulong_t)(elem)->b_cont, \
            (ulong_t)(elem))) { \
        void_atomic_inc_ulong(&((stk)->mst_cnt)); \
    } else { \
        /* \
         * The only way that the element can change is if we race \
         * with mblk_stk_popall_atomic( ), which will set mst_head \
         * to NULL. \
         */ \
        (elem)->b_cont = (mblk_t *)NULL; \
        INSIST(atomic_cmpxchg_ulong((ulong_t *)&((stk)->mst_head), \
                (ulong_t)NULL, \
                (ulong_t)(elem)), \
                "mblk_stk_push_atomic: " \
```

TABLE 4-continued

```
            "unexpected cmpxchg failure"); \
        /* \
         *+ Internal software inconsistency. Corrective action: none. \
         */ \
        void_atomic_inc_ulong(&((stk)->mst_cnt)); \
    } \
}
```

The mblk_stk_popall_atomic( ) primitive atomically installs a NULL pointer into the head pointer of the victim stack, effectively emptying it. Note that it would not be safe to simply zero the count, since the mblk_stk_popall_atomic( ) primitive might be racing with either an mblk_stk_push_atomic( ) or an mblk_stk_pop_atomic( ) primitive. Therefore, mblk_stk_popall_atomics must count the elements that it actually obtained from the list, and atomically decrement the count by that number, as shown in Table 5.

TABLE 5

```
void
mblk_stk_popall_atomic(mblk_stk_t *stk, mblk_stk_t *dst)
{
    int i;
    mblk_t *mp;
    mblk_t *mp1;
    /* Atomically snapshot the stack head pointer while NULLing it
    out. */,
    mp = (mblk_t *)atomic_xchg_ulong((ulong_t *)&
    ((stk)->mst_head), NULL);
    /*
     * Count the number of mblks in the list. We cannot use the mst_cnt
     * field because it might be inaccurate due to races.
     */
    i=0
    for (mp1=mp; mp1 !=NULL; mp1=mp1->b_cont){
    }
    /*
     *Automatically decrease the count field by the number of
     *elements we removed. We cannot simply zero it because
     *we might be racing with mblk_stk_pop_atomic( ), which
     *might have removed the block * but not yet decremented
     *the mst_cnt field.
     */
    if (i!=0) {
        (void)atomic_sub_ulong(&(stk->mst_cnt), i);
    }
    /*Create the new stack from the remains. */
    dst->mst_head=mp;
    dst->mst_cnt=i;
}
```

Tracking Home Quad and Memory Class of Memory Blocks

All memory in a given vmblk is homed on a particular quad and is in a particular memory class. The quad ID and memory class are recorded in the dope-vector entry corresponding to that vmblk. This allows the following code fragment to locate the home quad and memory class corresponding to the memory pointed to by "bp", as shown in Table 6.

TABLE 6

```
vp = &(kmem_dope_vector[((ulong)bp) / KMEM_NBVMBLK]);
if ((vp->kmvd_vmblk == NULL) ||
    (((ulong)vp->kmvd_vmblk) > ((ulong)bp))) {
    vp--;
}
quadno = vp->kmvd_quadno;
memclass = vp->kmvd_mc;
```

Although this code is reasonably fast, it is not fast enough to allow searching for a memory block that is homed on the specified quad for a common-case allocation. The common case must consist of little more than adding to or deleting from a simple singly linked list. Therefore, the memory in a given engine pool must be homed on that engine's quad. This means that when freeing a block of memory, the allocator must check to see if it is homed on the proper quad, as shown in Table 7.

TABLE 7

```
if (bp's home quad is this quad) {
    Insert bp into per-engine pool for this CPU/memory-class
        combination
} else {
    Insert bp into its quad's per-quad pool that corresponds to
the memory class and the freeing quad
}
```

Since each quad maintains a coalesce-to-page structure, per-quad pool, and set of per-CPU pools for each memory class, this checking suffices to ensure that all memory in a given quads pools is homed on that quad. This means that a request for memory homed on a given quad may be satisfied simply by allocating it from that quad's per-quad pool. Of course, a request for memory homed on either the current quad or on any quad is satisfied from the requesting CPU's per-CPU pool.

Having illustrated and described the principles of the invention in a preferred embodiment, it should be apparent to those skilled in the art that the preferred embodiment can be modified in arrangement and detail without departing from such principles. For example, the method of the invention may be invoked via a different application programming interface (API) and may be used for kernel and user-level memory allocation. The steps of the inventive methods may be practiced in different order. Many of the software aspects of the embodiment may be implemented in hardware and visa versa. The invention may be used with other multiprocessor computer systems, with memory interconnect interfaces other than SCI, and with memory management techniques other than pages. The data structure may have any of a number of equivalent forms, with the fields storing physical addresses or pointers to physical addresses. In view of the many possible embodiments to which the principles of the invention may be applied, it should be recognized that the illustrated embodiment is only a preferred example of the invention and should not be taken as a limitation on the scope of the following claims.

APPENDIX A

| Term | Definition |
| --- | --- |
| block-pointer block | Data structure that contains pointers to vmblk pages containing a particular type of structure. Block-pointer-blocks are used by diagnostic programs to find all instances of a given type of structure without imposing unacceptable bookkeeping overhead on allocation and deallocation. The typename of a block-pointer-block is kmem_struct_bp_t. |
| coalesce-to-page structure | Data structure that contains lists and state required to coalesce small blocks back into pages so that they can be freed up and used for other-sized allocations. There is an instance of a coalesce-to-page structure for each combination of structure type/size, memory class, and node. The typename of a |

APPENDIX A-continued

| Term | Definition |
| --- | --- |
| | coalesce-to-page structure is kmem_coalesce2page_t. |
| cross-node pool | Data structure that consists of an array of entries, one per node, that is used to cache blocks homed on a particular node that are allocated and freed by CPUs on other nodes. The allocation primitives allow explicit cross-node allocation. Cross-node frees can happen when a data structure is allocated on one node, then passed to a CPU on another node, where it is freed. The typename of a per-node element of a cross-node pool is a mblk_global_quad_t. |
| combining tree | Data structure that allows low-overhead computation of simple quantities such as sums and intersections. |
| distributed reference counter | Data structure that allows efficient checking that a quantity remains within predetermined bounds. The typenames involved in this structure are refcnt_t, refcnt_quad_t, and refcnt_eng_t. |
| dope vector | Array of entries used to track vmblks. The dope vector is used to efficiently determine the type of a given block of memory, and to efficiently locate the structures corresponding to that block of memory. The typename of a dope-vector entry is kmem_vmblk_dope_entry_t. |
| engine | CPU |
| global pool | Historical name for a per-node pool. |
| homed | Physical memory that is on a given node's motherboard is said to be Ahomed≈ on that node. |
| system interconnect board | Printed circuit board that connects the local bus on a node to the SCI ring. |
| memory class | A range of physical addresses that can be reached by a particular type of DMA controller. For example the PCI bus allows 64-bit addresses, but many PCI controller cards are only capable of supplying 32-bit addresses. In this case, the lower 4 GB of memory would be in class zero, and the memory above 4 GB would be in class 1. Buffers that are to be DMAed by a 32-bit PCI controller must be allocated from memory class 0. |
| page-description entry | An element of a vmblk header that describes the current state of one page of the vmblk. This state includes whether the page is joined with its predecessor and/or successor, if it has been split into smaller blocks (and their size if so), pointers to coalesce-to-page and block-pointer block, block freelist, and pointers to other page-descriptors of the same type. The typename of a page-description entry is kmem_page_desc_t. |
| per-CPU pool | Data structure that contains a small list of blocks suitable for a specific size of structure. This cache of blocks is normally only accessed by its CPU, thereby reducing the number of expensive cache misses incurred. The typename of a per-CPU pool is mblk_pereng_t. |
| per-node pool | Data structure that mediates between the per-CPU pools and a given node's coalesce-to-page structure, and also contains a pointer to a cross-node pool. For historical reasons, the per-node pool is almost always called a Aglobal pool≈. The typename of a per-node pool is mblk_global_t. |
| physical memory | The set of addresses that refer to the underlying physical storage. Any particular word of physical memory will be located on a particular node. The memory is said to be Ahomed≈ on that node. |
| node | Module containing memory, CPUs, local bus and cache. Also referred to as quads when the node has just four processors, nodes are |

APPENDIX A-continued

| Term | Definition |
|---|---|
| | interconnected with Lynx boards and an SCI ring to form a large shared-memory computer system. |
| SCI ring | High-speed shared-memory interconnect defined by the IEEE 1596–1992 standard. |
| virtual memory | The set of addresses that may be specified by machine instructions. During instruction execution, these virtual addresses are translated to physical addresses that directly address the underlying physical memory. Virtual memory cannot itself store values, it simply refers to the underlying physical memory. An in-kernel memory allocator must handle virtual and physical memory separately, while an allocator in a user program is normally unable to distinguish between the two. |
| vmblk | Contiguous area of virtual memory from which allocations take place. A vmblk contains a vmblk header with one page-description entry that describes each page in the remainder of the vmblk. Each vmblk has at least one dope-vector entry that refers to that vmblk and that holds state information describing the vmblk as a whole. |
| vmblk header | First portion of a vmblk. The vmblk header is an array of page-description entries. There is one page-description entry for each data page in the vmblk. The first page-description entry describes the first data page; there are no page description entries that describe the vmblk header itself. |

We claim:

1. In a multiprocessor system having shared physical memory distributed among a plurality of nodes, a method of dynamically allocating memory on a specified node of the system, the method comprising:

receiving a request to dynamically allocate an amount of physical memory on a specified node, the request received from a process;

in response to the request, dynamically allocating the amount of physical memory on the specified node; and indicating an address for the dynamically allocated amount of physical memory, wherein:

receiving the request includes a request to allocate the amount of physical memory from a specified memory pool;

allocating the amount of physical memory includes allocating the amount of physical memory from the specified pool, and dynamically allocating the amount of physical memory on the specified node comprises:

assigning a first variable to represent a count of memory structures in the physical memory, the count of memory structures in the physical memory represented by the first variable corresponding to a global count of memory structures in the physical memory for the multiprocessor system as a whole;

assigning multiple second variables, each second variables to represent a count of memory structures in the memory, the count of memory structures in the physical memory represented by each multiple second variable corresponding to a local count of memory structures in the physical memory for one of the plurality of nodes;

determining dynamically changeable desired levels of value of the multiple second variables as based on a distance between a total value of the multiple second variables and a predetermined limit of the multiple second variables;

maintaining a third variable, the third variable having a first part that stores the dynamically changeable desired levels of value of the multiple second variables, the third variable having a second part that stores the predetermined limit of the multiple second variables, and the third variable having a third part storing a leftover value of the multiple second variables, the leftover value being no less than one;

determining whether a selected second variable of the multiple second variables can be changed by the requested amount and stay within the dynamically changeable desired levels of value of the multiple second variables based on the total value of the multiple second variables and based on the predetermined limit of the multiple second variables as stored in the second part of the third variable;

if so, changing the selected second variable by the requested amount; and if not, changing the first variable by the requested amount.

2. The method of claim 1 wherein the memory being allocated is within the address space of the operating system.

3. The method of claim 1 wherein:

receiving the request comprises receiving a call from a processor, the call including arguments specifying the size of memory and node specified;

allocating the memory comprises executing a function called by the call; and indicating the address comprises returning a value to the source of the call.

4. The method of claim 1 wherein receiving the request comprises receiving a call from a processor, the call including arguments specifying the size of memory and node specified, and allocating the memory comprises:

selecting a data structure for the node specified, the data structure providing access to memory blocks on the specified node of the memory size specified; and taking an available memory block from the blocks accessible through the data structure.

5. The method of claim 4 wherein selecting the data structure comprises:

determining if the node specified is the same node on which the processor that made the call is located;

if not, selecting a first data structure that provides access to memory blocks made available by the specified node to the node on which the processor is located;

if so, selecting a second data structure that provides access to memory blocks available to the processor.

6. The method of claim 4 wherein selecting the data structure comprises:

determining which of a number of memory block sizes corresponds to the memory size request; and selecting a data structure that provides access to memory blocks of a size corresponding to the memory size request.

7. The method of claim 1 wherein the node request is encoded into a multi-bit flags argument of a memory allocation function call for interpretation by a function, the function call and flags argument being of a same format as the format of a pre-existing memory allocation function call but using one or more previously-unused bits of the flags argument to indicate the specified node, whereby the memory allocation function call is compatible with the pre-existing function call.

8. The method of claim 7 wherein, if the bits for making the node request are set to a default value in the multi-bit flags argument, the request defaults to the node on which a processor making the request is located and, if memory is not available on this node, then to another node where memory is available.

9. The method of claim 1 wherein:
receiving the request includes receiving a request that memory be allocated on any other system node if memory is not immediately available on the specified node; and
allocating the memory includes allocating memory on another system node if memory is not immediately available on the specified node.

10. The method of claim 1 wherein receiving the request includes a request to delay allocating the memory until memory is available on the specified node.

11. The method of claim 1 wherein receiving the request includes a request that allocating the memory indicate failure if memory is not available on the specified node.

12. The method of claim 1 wherein:
receiving the request includes a request to allocate memory from a specified memory class; and
allocating the memory includes allocating memory from the specified class.

13. The method of claim 12 wherein the memory class request is encoded into a multi-bit flags argument of a memory allocation function call for interpretation by a function, the function call and flags argument being of a same format as the format of a pre-existing memory allocation function call but using one or more previously unused bits of the flags argument to indicate the specified memory class, whereby the memory allocation function call is compatible with the pre-existing function call.

14. The method of claim 13 wherein, if the bits for making the memory class request are set to a default value in the multi-bit flags argument, the request defaults to a particular class of memory and, if memory is not available in this class, then to another class for which memory is available.

15. The method of claim 12 wherein the specified memory class is memory accessible by way of direct memory access (DMA) by a particular device.

16. The method of claim 12 wherein:
receiving the request includes a request that memory be allocated from another memory class if memory from the specified memory class is not available; and
allocating the memory includes allocating memory from another memory class if memory from the specified memory class is not available.

17. The method of claim 12 wherein receiving the request includes a request to delay allocating the memory until memory from the specified class is available.

18. The method of claim 12 wherein receiving the request includes a request that allocating the memory indicate failure if memory from the specified class is not available.

19. The method of claim 1 wherein receiving the request includes one or more of: a request to delay allocating the memory until memory from the specified pool is available, and a request that allocating the memory indicate failure if memory from the specified pool is not available.

20. In a multiprocessor system with shared physical memory, the a method of dynamically allocating physical memory among the multiple processors, the method comprising:
providing a pool of available physical memory blocks per processor;
in response to a first processor makes a physical memory allocation request for an amount of physical memory from the first processor's pool, dynamically allocating the amount of physical memory for the first processor without acquiring a lock on the pool; and
in response to a second processor makes a physical memory allocation request for an amount of physical memory from the first processor's pool, dynamically allocating the amount of physical memory for the second processor from the first processor's pool after acquiring a lock on the pool;
wherein dynamically allocating the amount of physical memory comprises:
assigning a first variable to represent a count of memory structures in the physical memory, the count of memory structures in the physical memory represented by the first variable corresponding to a global count of memory structures in the physical memory for the multiprocessor system as a whole;
assigning multiple second variables, each second variables to represent a count of memory structures in the memory, the count of memory structures in the physical memory represented by each multiple second variable corresponding to a local count of memory structures in the physical memory for one of the plurality of nodes;
determining dynamically changeable desired levels of value of the multiple second variables as based on a distance between a total value of the multiple second variables and a predetermined limit of the multiple second variables;
maintaining a third variable, the third variable having a first part that stores the dynamically changeable desired levels of value of the multiple second variables, the third variable having a second part that stores the predetermined limit of the multiple second variables, and the third variable having a third part storing a leftover value of the multiple second variables, the leftover value being no less than one;
determining whether a selected second variable of the multiple second variables can be changed by the requested amount and stay within the dynamically changeable desired levels of value of the multiple second variables based on the total value of the multiple second variables and based on the predetermined limit of the multiple second variables as stored in the second part of the third variable;
if so, changing the selected second variable by the requested amount; and
if not, changing the first variable by the requested amount.

21. The method of claim 20 wherein the shared memory is distributed shared memory.

* * * * *